US012477288B2

(12) United States Patent
May et al.

(10) Patent No.: US 12,477,288 B2
(45) Date of Patent: Nov. 18, 2025

(54) ADVANCED HEARING PROSTHESIS RECIPIENT HABILITATION AND/OR REHABILITATION

(71) Applicant: Cochlear Limited, Macquarie University (AU)

(72) Inventors: Jim May, Macquarie University (AU); Janette Oliver, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 0 days.

(21) Appl. No.: 18/241,406

(22) Filed: Sep. 1, 2023

(65) Prior Publication Data

US 2023/0412995 A1 Dec. 21, 2023

Related U.S. Application Data

(62) Division of application No. 17/045,248, filed as application No. PCT/IB2019/052782 on Apr. 4, 2019, now Pat. No. 11,750,989.

(60) Provisional application No. 62/652,971, filed on Apr. 5, 2018.

(51) Int. Cl.
*H04R 25/00* (2006.01)

(52) U.S. Cl.
CPC .......... *H04R 25/70* (2013.01); *H04R 25/505* (2013.01); *H04R 25/558* (2013.01); *H04R 2225/55* (2013.01)

(58) Field of Classification Search
CPC .... H04R 25/70; H04R 25/505; H04R 25/558; H04R 2225/55
USPC .......... 381/314
See application file for complete search history.

(56) References Cited

U.S. PATENT DOCUMENTS

| | | | |
|---|---|---|---|
| 7,908,273 | B2 | 3/2011 | DiMaria et al. |
| 7,983,915 | B2 | 7/2011 | Knight et al. |
| 8,423,363 | B2 | 4/2013 | Gupta et al. |
| 8,805,657 | B2 | 8/2014 | Wells et al. |
| 9,501,568 | B2 | 11/2016 | Rafii |
| 9,535,987 | B2 | 1/2017 | Ponting |
| 9,734,408 | B2 | 8/2017 | Betley et al. |

(Continued)

FOREIGN PATENT DOCUMENTS

| | | | |
|---|---|---|---|
| CN | 1466111 | A | 1/2004 |
| CN | 102405495 | A | 4/2012 |

(Continued)

OTHER PUBLICATIONS

International Search Report & Written Opinion for PCT/IB2019/052782, mailed Aug. 12, 2019.

(Continued)

*Primary Examiner* — Sean H Nguyen
(74) *Attorney, Agent, or Firm* — Pilloff Passino & Cosenza LLP; Martin J. Cosenza

(57) ABSTRACT

A method of increasing an ability of a recipient of a hearing prosthesis' ability to hear with the hearing prosthesis, including obtaining data indicative of a first characteristic of content, wherein the content is an audio or an audio-visual content, obtaining data indicative of a second characteristic of the content, identifying, based on the first and second characteristics, specific content and using at least one item of the specific content with the hearing prosthesis such that a hearing percept in the recipient is evoked based on the at least one item of specific content.

27 Claims, 21 Drawing Sheets

(56) References Cited

U.S. PATENT DOCUMENTS

| | | | |
|---|---|---|---|
| 2005/0129262 | A1 | 6/2005 | Dillon et al. |
| 2007/0033228 | A1 | 2/2007 | Fassett et al. |
| 2007/0276285 | A1 | 11/2007 | Burrows et al. |
| 2010/0257129 | A1 | 10/2010 | Lyon et al. |
| 2010/0260363 | A1 | 10/2010 | Glatt et al. |
| 2011/0060384 | A1 | 3/2011 | Lineaweaver |
| 2014/0250355 | A1 | 9/2014 | Jimison et al. |
| 2015/0195661 | A1 | 7/2015 | Neumann et al. |
| 2015/0209585 | A1 | 7/2015 | Lineaweaver |
| 2015/0245156 | A1 | 8/2015 | Tsang |
| 2016/0088405 | A1 | 3/2016 | Wernaers et al. |
| 2016/0302013 | A1 | 10/2016 | Andersson |
| 2021/0168544 | A1 | 6/2021 | May et al. |

FOREIGN PATENT DOCUMENTS

| | | | |
|---|---|---|---|
| CN | 102612354 | A | 7/2012 |
| CN | 104735599 | A | 6/2015 |
| CN | 104869501 | A | 8/2015 |
| CN | 107548563 | A | 1/2018 |
| KR | 20100112687 | A | 10/2010 |
| WO | 9931640 | A1 | 6/1999 |
| WO | 2007137232 | A2 | 11/2007 |

OTHER PUBLICATIONS

Office Action for China Patent Application No. 2019800248563, mailed May 8, 2021.

Extended European Search Report for EP Application No. 19 782 159.8, mailed Nov. 19, 2021.

510

ADVANCED HEARING PROSTHESIS RECIPIENT HABILITATION AND/OR REHABILITATION

CROSS-REFERENCE TO RELATED APPLICATIONS

This application is a Divisional application of U.S. patent application Ser. No. 17/045,248, filed Oct. 5, 2020, which is a National Stage of PCT/IB2019/052782, filed Apr. 4, 2019, which claims priority from U.S. Provisional Application No. 62/652,971, filed on Apr. 5, 2018, the entire contents of these applications being incorporated herein by reference in their entirety.

BACKGROUND

Hearing loss, which may be due to many different causes, is generally of two types: conductive and sensorineural. Sensorineural hearing loss is due to the absence or destruction of the hair cells in the cochlea that transduce sound signals into nerve impulses. Various hearing prostheses are commercially available to provide individuals suffering from sensorineural hearing loss with the ability to perceive sound. One example of a hearing prosthesis is a cochlear implant.

Conductive hearing loss occurs when the normal mechanical pathways that provide sound to hair cells in the cochlea are impeded, for example, by damage to the ossicular chain or the ear canal. Individuals suffering from conductive hearing loss may retain some form of residual hearing because the hair cells in the cochlea may remain undamaged.

Individuals suffering from hearing loss typically receive an acoustic hearing aid. Conventional hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient. This amplified sound reaches the cochlea causing motion of the perilymph and stimulation of the auditory nerve. Cases of conductive hearing loss typically are treated by means of bone conduction hearing aids. In contrast to conventional hearing aids, these devices use a mechanical actuator that is coupled to the skull bone to apply the amplified sound.

In contrast to hearing aids, which rely primarily on the principles of air conduction, certain types of hearing prostheses commonly referred to as cochlear implants convert a received sound into electrical stimulation. The electrical stimulation is applied to the cochlea, which results in the perception of the received sound.

Many devices, such as medical devices that interface with a recipient, have structural and/or functional features where there is utilitarian value in adjusting such features for an individual recipient. The process by which a device that interfaces with or otherwise is used by the recipient is tailored or customized or otherwise adjusted for the specific needs or specific wants or specific characteristics of the recipient is commonly referred to as fitting. One type of medical device where there is utilitarian value in fitting such to an individual recipient is the above-noted cochlear implant. That said, other types of medical devices, such as other types of hearing prostheses, exist where there is utilitarian value in fitting such to the recipient.

There are other types of medical devices that enhance or otherwise provide sensory stimulation, such as, by way of example only and not by way of limitation, visual prostheses, such as retinal implants. Collectively, these devices (hearing, visional, etc.) will be described herein as sensory prostheses or sensory medical devices. Some embodiments of some such sensory prostheses include one or more sensory stimulation evoking phenomenon capture apparatuses, such as by way of example only and not by way of limitation, a microphone or a camera, etc. It is noted that sensory stimulation evoking phenomenon does not require that the phenomenon evoke the stimulation in all people (the phenomenon exists irrespective of whether it can be, for example, seen by a blind person or heard by a deaf person).

SUMMARY

In accordance with another exemplary embodiment, there is a method of improving a recipient of a hearing prosthesis' ability to hear with the hearing prosthesis, comprising obtaining data indicative of a first characteristic of content, wherein the content is an audio or an audio-visual content, obtaining data indicative of a second characteristic of the content, identifying, based on the first and second characteristics, specific content and using at least one item of the specific content with the hearing prosthesis such that a hearing percept in the recipient is evoked based on the at least one item of specific content.

In accordance with another exemplary embodiment, there is a method, comprising receiving, electronically, first input indicative of a recipient of a hearing prosthesis' desired media content, providing the recipient with one or more topic item selections based on the first received input and training or retraining a recipient of a cochlear implant to recognize and/or distinguish sounds with the prosthesis using consumer readily available media content corresponding to the provided one or more topic item selections, wherein the training or retraining increases a training compliance relative to that which would be the case in the absence of the first input.

In accordance with another exemplary embodiment, there is a hearing prosthesis training system, comprising a first sub-system configured to receive first input indicative of a recipient of a hearing prosthesis' desired audio and/or audio-visual content and receive second input indicative of a feature of the recipient that is related to a sensory and/or a mental state of the recipient and a second sub-system configured to identify media content based on the first and second input.

In accordance with another exemplary embodiment, there is a method of identifying hearing prosthesis recipient utilitarian audio content, comprising searching for audio and/or audio-visional content and identifying such, evaluating the identified content, wherein the action of evaluating the content evaluates the content for linguistic properties and/or audio properties.

In accordance with another exemplary embodiment, there is a hearing habilitation and/or rehabilitation method, comprising providing first input indicative of audio and/or audio-visual content to be used by a recipient of a hearing prosthesis, providing second input indicative of recipient comprehension ability and/or recipient comprehension influencing feature demand, receiving one or more specific content items and/or indicator(s) of the one or more specific content items based on an analysis of the first and second inputs and a culled a sub-group of content items from a larger group of content items, selecting one of the one or more specific content items for listening and/or viewing, and habilitating and/or rehabilitating hearing of the recipient by listening to the one of the one or more specific content items.

BRIEF DESCRIPTION OF THE DRAWINGS

Embodiments are described below with reference to the attached drawings, in which.

DETAILED DESCRIPTION

Figure 1:
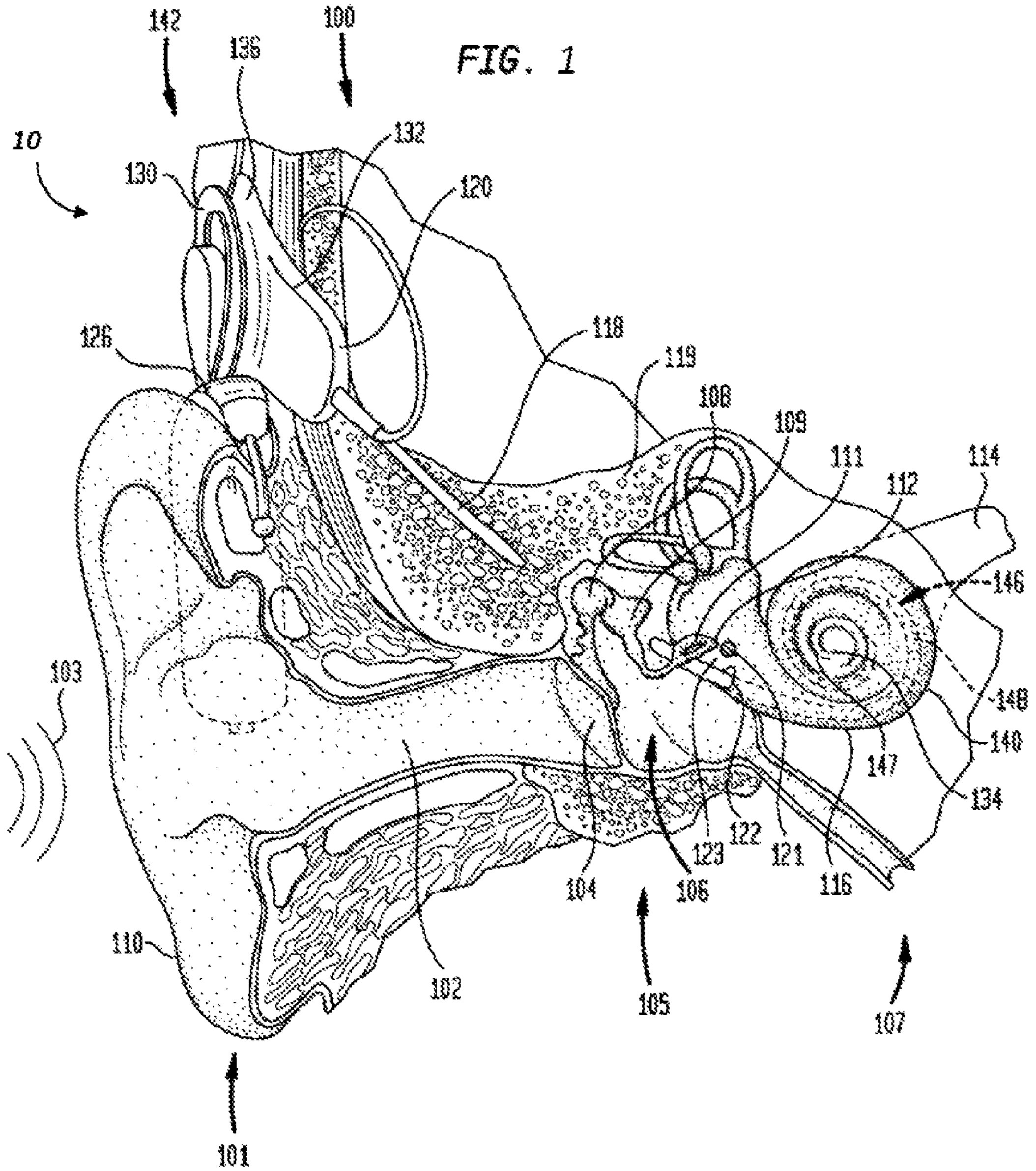
FIG. 1 is a perspective view of an exemplary hearing prosthesis in which at least some of the teachings detailed herein are applicable.

FIG. 1 is a perspective view of a cochlear implant, referred to as cochlear implant 100, implanted in a recipient, to which some embodiments detailed herein and/or variations thereof are applicable. The cochlear implant 100 is part of a system 10 that can include external components in some embodiments, as will be detailed below. Additionally, it is noted that the teachings detailed herein are also applicable to other types of hearing prostheses, such as by way of example only and not by way of limitation, bone conduction devices (percutaneous, active transcutaneous and/or passive transcutaneous), direct acoustic cochlear stimulators, middle ear implants, and conventional hearing aids, etc. Indeed, it is noted that the teachings detailed herein are also applicable to so-called multi-mode devices. In an exemplary embodiment, these multi-mode devices apply both electrical stimulation and acoustic stimulation to the recipient (sometimes referred to as an electro-acoustic stimulator). In an exemplary embodiment, these multi-mode devices evoke a hearing percept via electrical hearing and bone conduction hearing. Accordingly, any disclosure herein with regard to one of these types of hearing prostheses corresponds to a disclosure of another of these types of hearing prostheses, or any medical device for that matter, unless otherwise specified, or unless the disclosure thereof is incompatible with a given device based on the current state of technology. Thus, the teachings detailed herein are applicable, in at least some embodiments, to partially implantable and/or totally implantable medical devices that provide a wide range of therapeutic benefits to recipients, patients, or other users, including hearing implants having an implanted microphone, auditory brain stimulators, visual prostheses (e.g., bionic eyes), sensors, functional electrical stimulation devices, etc.

In view of the above, it is to be understood that at least some embodiments detailed herein and/or variations thereof are directed towards a body-worn sensory supplement medical device (e.g., the hearing prosthesis of FIG. 1, which supplements the hearing sense, even in instances where all-natural hearing capabilities have been lost). It is noted that at least some exemplary embodiments of some sensory supplement medical devices are directed towards devices such as conventional hearing aids, which supplement the hearing sense in instances where some natural hearing capabilities have been retained, and visual prostheses (both those that are applicable to recipients having some natural vision capabilities remaining and to recipients having no natural vision capabilities remaining). Accordingly, the teachings detailed herein are applicable to any type of sensory supplement medical device to which the teachings detailed herein are enabled for use therein in a utilitarian manner. In this regard, the phrase sensory supplement medical device refers to any device that functions to provide sensation to a recipient irrespective of whether the applicable natural sense is only partially impaired or completely impaired.

The recipient has an outer ear 101, a middle ear 105, and an inner ear 107. Components of outer ear 101, middle ear 105, and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear channel 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 108, the incus 109, and the stapes 111. Bones 108, 109, and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown, cochlear implant 100 comprises one or more components which are temporarily or permanently implanted in the recipient. Cochlear implant 100 is shown in FIG. 1 with an external device 142, that is part of system 10 (along with cochlear implant 100), which, as described below, is configured to provide power to the cochlear implant, where the implanted cochlear implant includes a battery that is recharged by the power provided from the external device 142.

In the illustrative arrangement of FIG. 1, external device 142 can comprise a power source (not shown) disposed in a Behind-The-Ear (BTE) unit 126. External device 142 also includes components of a transcutaneous energy transfer link, referred to as an external energy transfer assembly. The transcutaneous energy transfer link is used to transfer power and/or data to cochlear implant 100. Various types of energy transfer, such as infrared (IR), electromagnetic, capacitive and inductive transfer, may be used to transfer the power and/or data from external device 142 to cochlear implant 100. In the illustrative embodiments of FIG. 1, the external energy transfer assembly comprises an external coil 130 that forms part of an inductive radio frequency (RF) communication link. External coil 130 is typically a wire antenna coil comprised of multiple turns of electrically insulated single-strand or multi-strand platinum or gold wire. External device 142 also includes a magnet (not shown) positioned within the turns of wire of external coil 130. It should be appreciated that the external device shown in FIG. 1 is merely illustrative, and other external devices may be used with embodiments of the present invention.

Cochlear implant 100 comprises an internal energy transfer assembly 132 which can be positioned in a recess of the temporal bone adjacent auricle 110 of the recipient. As detailed below, internal energy transfer assembly 132 is a component of the transcutaneous energy transfer link and receives power and/or data from external device 142. In the illustrative embodiment, the energy transfer link comprises an inductive RF link, and internal energy transfer assembly 132 comprises a primary internal coil 136. Internal coil 136 is typically a wire antenna coil comprised of multiple turns of electrically insulated single-strand or multi-strand platinum or gold wire.

Cochlear implant 100 further comprises a main implantable component 120 and an elongate electrode assembly 118. In some embodiments, internal energy transfer assembly 132 and main implantable component 120 are hermetically sealed within a biocompatible housing. In some embodiments, main implantable component 120 includes an implantable microphone assembly (not shown) and a sound processing unit (not shown) to convert the sound signals received by the implantable microphone in internal energy transfer assembly 132 to data signals. That said, in some alternative embodiments, the implantable microphone assembly can be located in a separate implantable component (e.g., that has its own housing assembly, etc.) that is in signal communication with the main implantable component 120 (e.g., via leads or the like between the separate implantable component and the main implantable component 120). In at least some embodiments, the teachings detailed herein and/or variations thereof can be utilized with any type of implantable microphone arrangement.

Main implantable component 120 further includes a stimulator unit (also not shown) which generates electrical stimulation signals based on the data signals. The electrical stimulation signals are delivered to the recipient via elongate electrode assembly 118.

Elongate electrode assembly 118 has a proximal end connected to main implantable component 120, and a distal end implanted in cochlea 140. Electrode assembly 118 extends from main implantable component 120 to cochlea 140 through mastoid bone 119. In some embodiments electrode assembly 118 may be implanted at least in basal region 116, and sometimes further. For example, electrode assembly 118 may extend towards the apical end of cochlea 140, referred to as cochlea apex 134. In certain circumstances, electrode assembly 118 may be inserted into cochlea 140 via a cochleostomy 122. In other circumstances, a cochleostomy may be formed through round window 121, oval window 112, the promontory 123 or through an apical turn 147 of cochlea 140.

Electrode assembly 118 comprises a longitudinally aligned and distally extending array 146 of electrodes 148, disposed along a length thereof. As noted, a stimulator unit generates stimulation signals which are applied by electrodes 148 to cochlea 140, thereby stimulating auditory nerve 114.

Figure 2A:
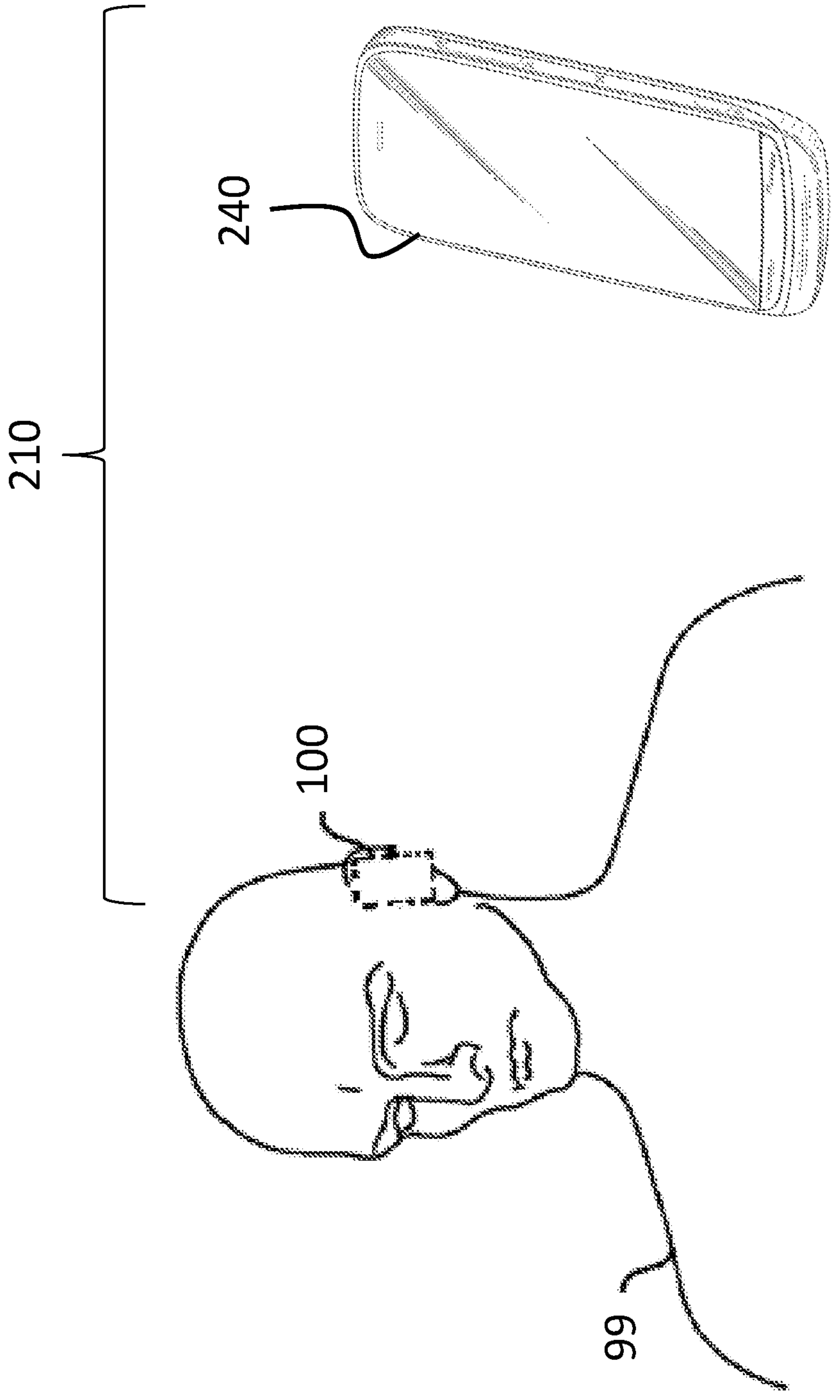
FIGS. 2A and 2B present an exemplary system including a hearing prosthesis and a remote device in the form of a portable hand-held device.
Figure 2B:
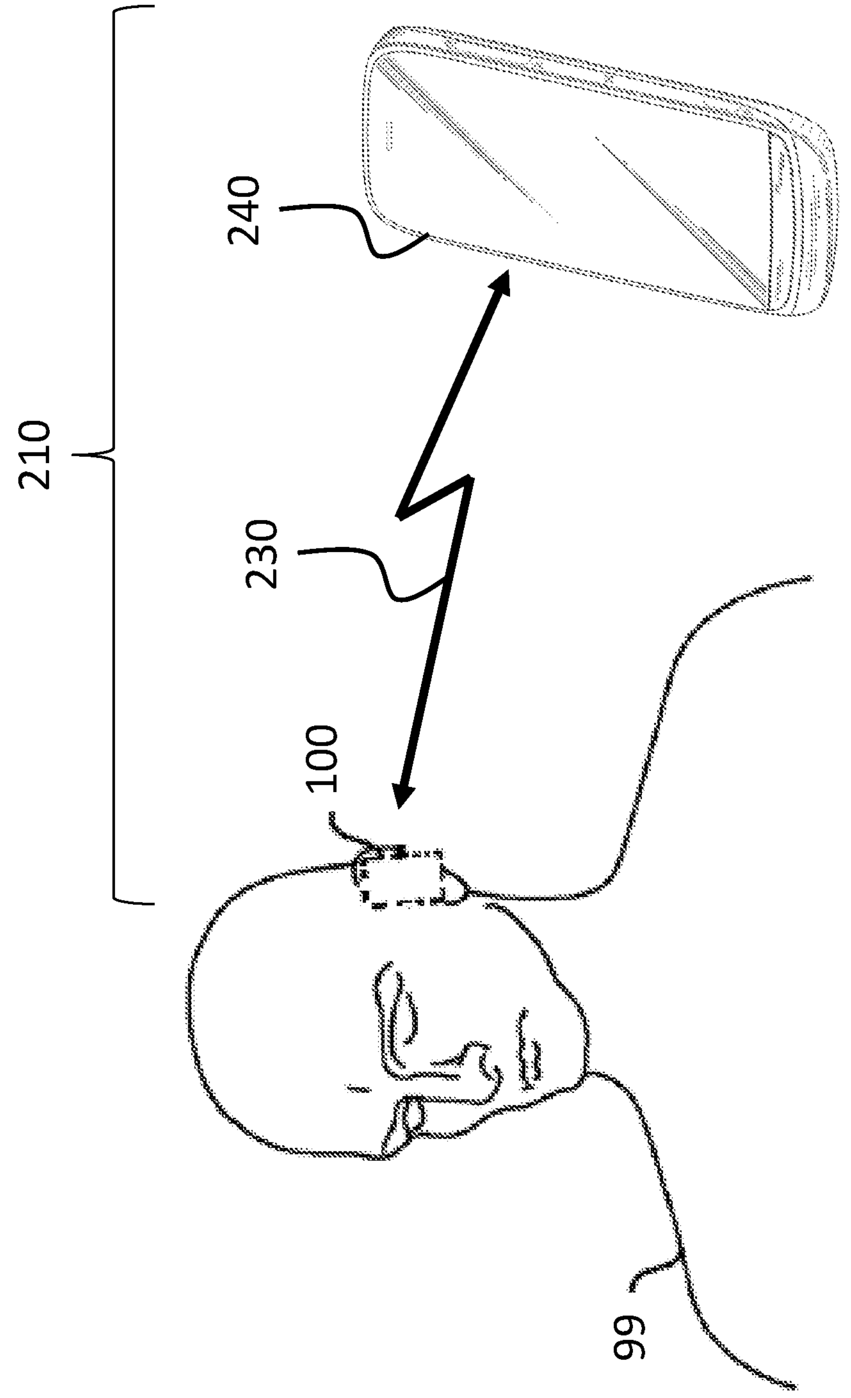

FIGS. 2A and 2B depict an exemplary system 210 according to an exemplary embodiment, including hearing prosthesis 100, which, in an exemplary embodiment, corresponds to cochlear implant 100 detailed above, and a portable handheld device 240. The embodiment of FIG. 2B has a wireless link 230 with the hearing prosthesis 100, whereas the alternate embodiment depicted in FIG. 2A does not have such a link. In an exemplary embodiment, the hearing prosthesis 100 is an implant implanted in recipient 99 (as represented functionally by the dashed lines of box 100 in FIGS. 2A/2B). In an exemplary embodiment, as represented in FIG. 2B, the system 210 is configured such that cochlear implant 100 and the portable handheld device 240 (e.g., a portable cellular telephone, such as by way of example only and not by way of limitation, a smart phone as that phrase is utilized generically) have a relationship, although in FIG. 2A, there is no such direct relationship. By way of example only and not by way of limitation, in an exemplary embodiment, the relationship is the ability of the smartphone to serve as a control device of the hearing prosthesis 100 via the wireless link 230. Alternatively, or in addition to this, the relationship is to only stream an audio signal captured by the microphone of the smartphone to the hearing prosthesis so the hearing prosthesis can evoke a hearing percept based on that audio stream (other relationships exist, as will be detailed). In some embodiments, the portable hand-held device 240 only extends the hearing prosthesis system, but is not a control device of the hearing prosthesis system. That said, in some embodiments, there is a different relationship between the two devices. Instead, for instance, the two devices can be utilized simultaneously to achieve utilitarian value as will be described below. The two devices work completely autonomously relative to one another, although in some such exemplary embodiments, one or both of the devices can be "aware" that one or both devices are being utilized simultaneously with the other. Some additional details of this will be described below. To be clear, in some embodiments, the remote device cannot be used to actively adjust the prosthesis 100, but such does not exclude the ability of the remote device to provide a prompt to the recipient indicating that there can be utilitarian value with respect to the recipients adjusting the hearing prosthesis 100. In some embodiments, pairing between the devices exists during operation of one or more or all of the devices, and this pairing is recognized by one or more or all of the devices.

It is noted that while the embodiments detailed herein will be often described in terms of utilization of a cochlear implant, alternative embodiments can be utilized in other types of hearing prostheses, such as by way of example only and not by way of limitation, bone conduction devices (percutaneous, active transcutaneous and/or passive transcutaneous), direct acoustic cochlear implants (DACI), and conventional hearing aids. Accordingly, any disclosure herein with regard to one of these types of hearing prostheses corresponds to a disclosure of another of these types of hearing prostheses or any other prosthetic medical device for that matter, unless otherwise specified, or unless the disclosure thereof is incompatible with a given hearing prosthesis based on the current state of technology.

Figure 3:
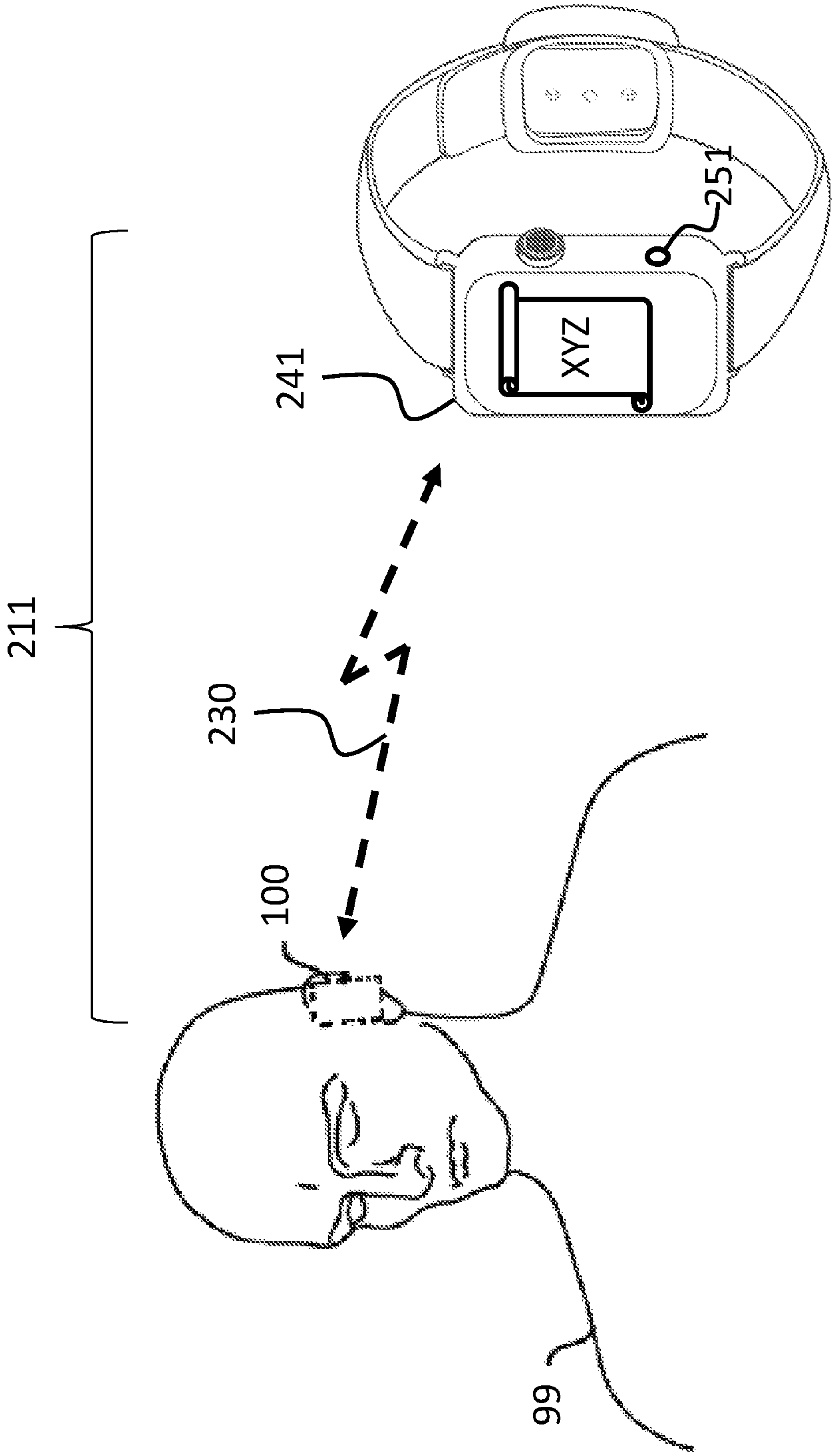
FIG. 3 presents an exemplary system including a hearing prosthesis and a remote device in the form of a smartwatch.

FIG. 3 depicts an exemplary system 211 according to an exemplary embodiment, including hearing prosthesis 100, which, in an exemplary embodiment, corresponds to cochlear implant 100 detailed above, and a portable device 241 having an optional wireless link 230 with the hearing prosthesis 100, where, here, the portable device 241 is a smartwatch. In an exemplary embodiment, the hearing prosthesis 100 is an implant implanted in recipient 99 (as represented functionally by the dashed lines of box 100 in FIG. 2A and FIG. 2B). In an exemplary embodiment, the system 211 is configured such that cochlear implant 100 and the portable device 241 in the embodiment of a smart watch can have a relationship. By way of example only and not by way of limitation, in an exemplary embodiment, the relationship is the ability of the smartwatch 241 to serve as a remote microphone for the prosthesis 100 via the wireless link 230 and/or a control for the prosthesis. However, as is the case with the embodiments detailed above with respect to the smart phone, in some embodiments, there is no relationship. To be clear, any disclosure herein of a feature of the smart phone can correspond to a disclosure of a feature of the smartwatch, and/or vice versa, unless otherwise noted, providing that the art enables such. It is also noted that while the embodiments of FIGS. 2A and 2B and 3 are presented in terms of the remote device being a multiuse smart portable device, in some embodiments, the remote device is a device that is dedicated for implementing the teachings detailed herein. It is also noted that as will be detailed below, in some embodiments, one or more all of the aforementioned devices can be utilized at the same time in a given system and/or as substitutes for another component of the system.

To be clear, in an exemplary embodiment, the teachings detailed herein can be executed in whole or in part by a multiuse smart portable device configured to execute the teachings detailed herein. Also, the teachings detailed herein can be executed in whole or in part by a conventional computer (laptop, desktop, etc.), or by an interactive television, or by a device configured to access the internet or any device configured to access data associated with the teachings detailed herein. Any electronic device that is configured to execute one or more the method algorithms detailed herein can be utilized in at least some exemplary embodiments, where, in an exemplary embodiment, such configuration can be achieved via the use of software and/or firmware and/or hardware program to execute one or more the method actions detailed herein. Such electronic devices can be a processor and/or microprocessor-based. Additional details of such devices are described below. However, some utilitarian use thereof will now be described.

Utilizing hearing prostheses, such as cochlear implants, is not always a straightforward proposition. In some instances, a recipient needs to "relearn" how to hear. Electric hearing with a cochlear implant is not the same as natural hearing. Also, with respect to people who have never heard before, they must learn sounds from the very beginning. In an exemplary embodiment, there can be utilitarian value with respect to improving a rate of habilitation and/or rehabilitation by practicing listening. One way of doing so is by frequently engaging in conversations. Another way is to listen to such things as audiobooks and the like, or listen to television programs or the radio, etc.

In an exemplary embodiment, there are methods of habilitation and/or rehabilitation that include listening to certain types of audio content such as podcasts and audiobooks by hearing impaired people as a form of at-home practice/therapy. That said, in some scenarios of such therapy, a challenge can exist where the recipient struggles to find content that is both interesting to the recipient and well matched to his or her hearing ability. This can be the case at the early stages of the rehabilitation process. In some exemplary embodiments, a healthcare professional or the like, or otherwise a clinician can offer or otherwise recommend a list of content that matches their hearing ability. An example of content that might meet or otherwise the one part with a recipient's ability to hear could be, for example, children's stories. That said, in some such scenarios, recipients struggle to stay motivated and to practice because they do not find the restricted set of content (the recommended set, for example) to be particularly interesting. This could be the case, in an exemplary scenario, where the recipient is an adult, and the restricted content corresponds to children's stories or children's television, etc.

An exemplary embodiment includes an audio content search engine that is configured to enable users, such as hearing prosthesis recipients and/or healthcare professionals working with such recipients, etc., to search over a wide choice of audio content or content with audio content for content about topics in which a given recipient or a group of recipients is interested in with properties matching their listening ability. More on this below, but first, a brief summary of an exemplary system in general, of which the search user interface/search user service is a part, and the system that initially compiles the content.

Figure 4:
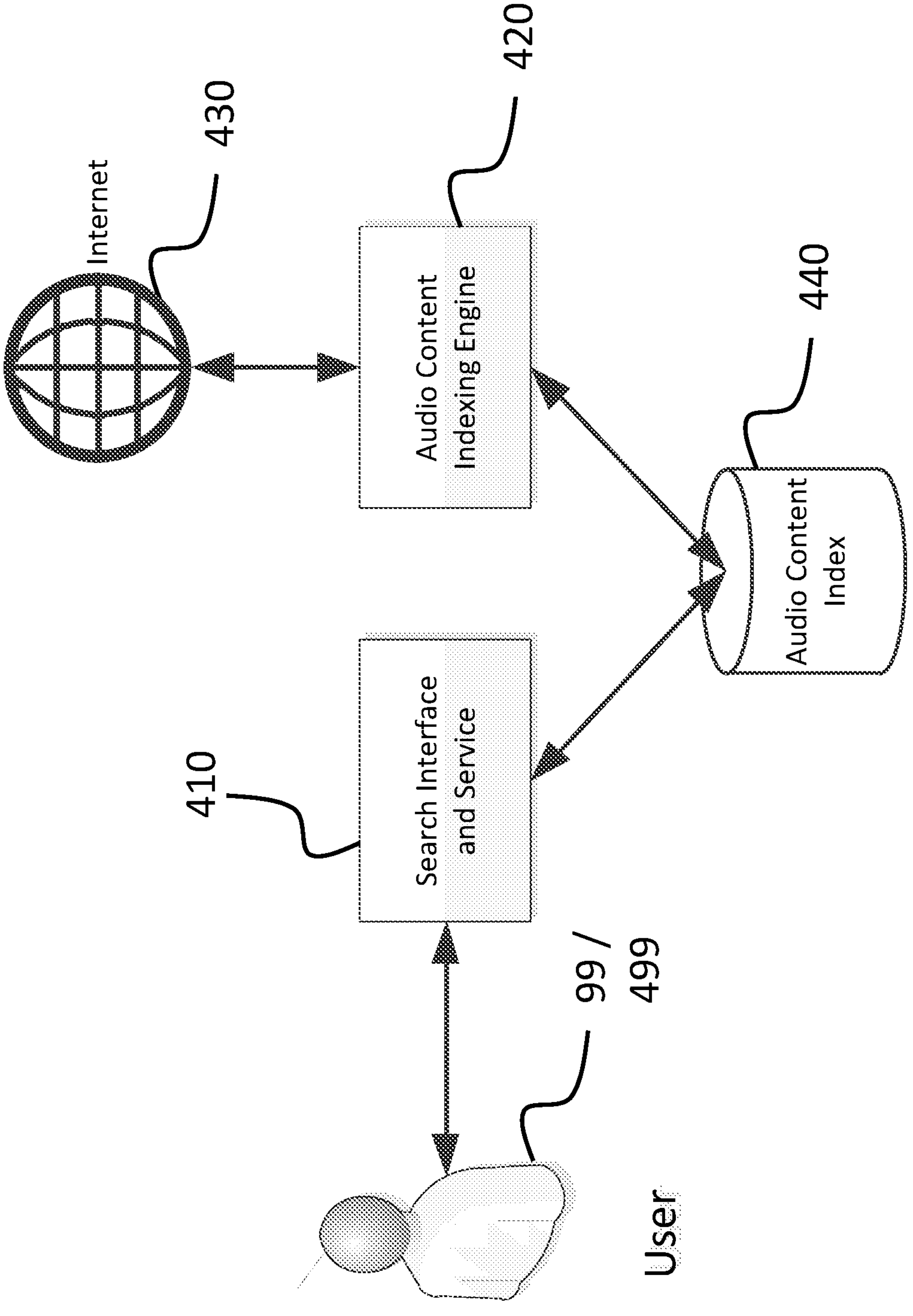
FIG. 4 presents an exemplary conceptual functional schematic according to an exemplary embodiment.

FIG. 4 depicts an exemplary conceptual overview according to an exemplary embodiment. Here, there is a search interface and service 410, corresponding to a search user interface in an exemplary embodiment, which interacts with a user 99, where the user is a recipient of a hearing prosthesis and/or a user 499, where the user is a healthcare professional or a caregiver or somebody working with (paid or unpaid, such as a parent or friend) a recipient of the hearing prosthesis.

FIG. 4 also depicts an audio content indexing engine 420. Briefly, in an exemplary embodiment, this can be a system that is configured to automatically seek out content having an audio content (music singing, audio books, television/video, etc.), analyze the content for various criteria, and tag or otherwise identify such content-based on the criteria, which tags will later be used, directly or indirectly, by, for example, the recipient, to vet or otherwise narrow down content that is interesting to the recipient, and also matches the recipient's hearing ability. In some exemplary embodiments of the system, the system can be a computer-based system that searches the World Wide Web 430 to find content and analyze the content according to an algorithm. In an exemplary embodiment, the various criteria—audio content criteria—could include, word rate, gender, accent, linguistic complexity level and/or background sound characteristics/level. All of this will be described in greater detail below, but from the moment, these are some of the criteria that would be tagged for a given content. Still further, a criteria could be the theme/topic of the content. If the content is a movie, the theme could be action, documentary, drama, comedy, romance, etc. If the content is a television show, the theme could be any of the just mentioned themes, and could also include news, weather, educational programming, etc. It is noted that this theme content need not necessarily be analyzed or evaluated during the action of finding the content. In this regard, it could be a simple matter of identifying the title of the content and utilizing an algorithm that narrows the contents based on title, etc.

In an exemplary embodiment, classifiers are developed or otherwise purchased that are specific for each of the aforementioned features/properties of the audio data (an accent classifier, a language classifier, a word rate classifier, etc.). A classifier can be a processor based device that receives audio input or otherwise receive input indicative of at least some features of audio input and analyzes that input according to an algorithm to classify the input. For example, classifiers exist that are utilized to classify written language, such as that utilized by Google. Accordingly, embodiments can utilize such classifiers in at least some exemplary embodiments, and otherwise utilize modified classifiers that are based on such commercially available classifiers.

The results of the analysis/the results of the search engines efforts can be stored in an audio content index 440. In an exemplary embodiment, this can be a cloud-based index. In an exemplary embodiment, this can be a database that can be downloaded to the recipient's smart phone or the like, or to the recipient's computer, etc. That is, in an exemplary embodiment, the audio content index 440 can be downloaded to the device of which the search interface and service 410 is a part.

Figure 5:
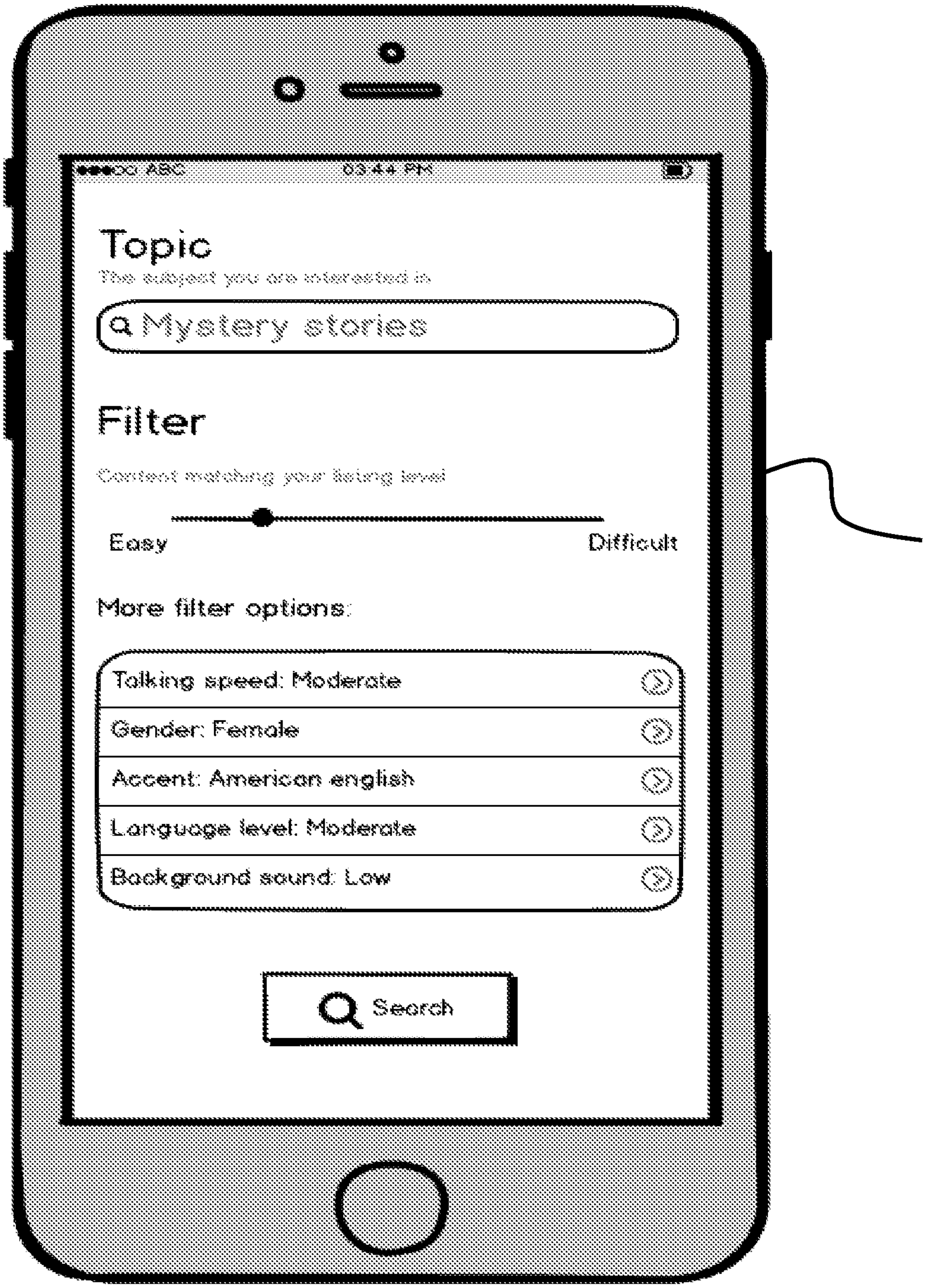
FIG. 5 presents an exemplary schematic of an exemplary embodiment.

Having established a database or the like compiled by the system, or otherwise having the ability to search for content, an embodiment includes a search user interface, which can be a part of the search interface and service 410, which can be a graphical user interface of a computer, or any of the smart devices detailed herein. FIG. 5 provides an exemplary schematic of an exemplary search user interface on a smart phone 510. Some additional features of the search user interface will be described in greater detail below. Briefly, the search user interface can enable users to enter the topic in which they are interested and/or the properties of the audio content so as to attempt to better match the content to their listening abilities relative to that which would be the case in the absence of the teachings detailed herein. FIG. 5 depicts an exemplary interface where the recipient has inputted the theme content of mystery stories for audiobooks into the search box of the interface 510. A filter is provided to filter based on the various audio content noted above. Note also there is a quick filter or a simple filter, that enable the recipient to identify content based on a scale between easy and difficult in an exemplary embodiment, this can be something that is compiled by the system via its analysis, or can be something that is generated by the search user interface or the like utilizing an algorithm that evaluates the tagged audio content criteria and determines the scale of ease of listening. In this regard, such can enable, in some embodiments, the simplification of the user experience by offering a single input option that aggregates some and/or all of the filter properties.

It is noted that while the embodiments detailed above focus on smart devices that can communicate with the hearing prosthesis, in other embodiments, the smart devices that have the search user interface need not be in communication or otherwise the control devices of the prostheses. These can be completely separate devices from the prosthesis that have nothing to do with the prosthesis. That said, in an alternate embodiment, the search user interface can be part of the prosthesis, where the prosthesis could communicate via cellular phone technology or via a telecoil or the like or via blue tooth technology or the like with the World Wide Web, etc.—the recipient could speak out loud such that the microphone of the hearing prosthesis would pick up the speech and analyze the speech and apply a search based thereon. Indeed, in an exemplary embodiment, the audio content index 440 could be stored in the hearing prosthesis. The prosthesis itself could identify the various specific content from the available content without interfacing with the outside world (save to obtain the audio content index), and notify the recipient of the various specific content returned based on the search/based on the filtering. The prosthesis could "talk" to the recipient and tell the recipient that he or she wants to watch the latest version of The Orient Express (in lieu of the earlier productions, because, for example, the audio quality of the new version is better than the old version, and the search user interface is set on easy—if the search user interface was set on hard, it very well might return the older version of The Orient Express). The recipient would "hear" the prosthesis tell the recipient that The Orient Express, 2017 release, is something he or she would find suitable, and then the recipient could go to the Internet or the like or use any of the various on demand systems provided with cable/satellite TV, etc., and watch (listen) to that movie.

Some additional details of the various components of the arrangement of FIG. 4 will now be described.

As noted above, some embodiments include an audio content search engine. In some exemplary embodiments, the audio content search engine can be used effectively once, and then disregarded after a database of content along with the various tags is developed. That said, there can be utilitarian value to periodically updating the database based on new content that was created since the last time that the database was created or updated, or otherwise identifying new content that was previously created, but not available on, for example, the World Wide Web. In view of the above, in an exemplary embodiment, there is a method that includes executing a search utilizing an audio content search engine 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 times or more, where each utilization is separated by a temporal period of, for example, variously, any of a least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, or 36 days, or weeks, or months. Moreover, in at least some exemplary embodiments, the search engine can be a smart search engine that narrows the search based on the prior search. Accordingly, the initial search could take days and/or weeks and/or months to compile the initial database, while subsequent searches could take less time.

In any event, the audio content indexing engine is the component, in at least some embodiments, that is responsible for extracting properties from speech audio content (speech files—which can be based on movies/video data that includes sound/speech) that are related to speech listening difficulty. Speech listening difficulty properties include linguistic properties related to language comprehension difficulty as well as audio properties that are related to speech listening difficulty. Again, it is these properties (or more accurately, indicia of these properties) that can be stored in the audio content index such that the Search Service is able to filter content by those properties.

Some additional examples of linguistic properties and/or audio properties are described below. Briefly, though, the phrase linguistic properties mean properties of language that can be fully represented in text rather than in audio form. In an exemplary embodiment, this is the equivalent to the output of a speech to text computer-based conversion system commercially available and/or the written text that is read aloud into a microphone to convert from text to audio. Linguistic properties are utilitarian in at least some exemplary embodiments of the teachings detailed herein in that in at least some exemplary scenarios, more complex language is more difficult to comprehend. For example, language with more sophisticated vocabulary can be more difficult to comprehend, especially when word recognition performance is already low. Thus, the teachings detailed herein can include identifying content with less sophisticated vocabulary to be used at a beginning of a recipient's hearing journey and identifying content with more sophisticated vocabulary to be used later on in the recipient's hearing journey. In this regard, the sophistication of the vocabulary can be utilized as a proxy to evaluate whether or not a recipient will have an easy time or hard time for something therebetween comprehending or otherwise listening to the audio data of the content. Embodiments herein include methods that include the action of utilizing content including less sophisticated vocabulary so as to enhance compliance with respect to a training regime relative to that which would be the case if more sophisticated vocabulary was utilized. Embodiments herein also include methods that include the action of utilizing content including more sophisticated vocabulary so as to tax or otherwise exercise the recipient's cognitive ability to a greater extent than that which would otherwise be the case. This is analogous to a runner or an athlete exercising more strenuously to develop muscles or stamina, etc.

Audio properties as that phrase is used herein corresponds to the properties of speech files that can only be represented in audio form. These include by way of example, the speed of speech (word rate), gender of the speaker, the accent and the background sound characteristics such as noise, music or sound effects, etc.

The teachings detailed herein can include identifying content with audio properties that are less taxing to a recipient to be used at a beginning of a recipient's hearing journey and identifying content with more taxing audio properties to be used later on in the recipient's hearing journey. In this regard, the complexity audio properties (a general term where more complexity means that the properties make it more difficult to comprehend the speech and less complexity means that the properties make it less difficult to comprehend the speech, all other things being equal) can be utilized as a proxy to evaluate whether or not a recipient will have an easy time or hard time for something therebetween comprehending or otherwise listening to the audio data of the content. Embodiments herein include methods that include the action of utilizing content including less complex audio properties so as to enhance compliance with respect to a training regime relative to that which would be the case if content having more complex audio properties were utilized. Embodiments herein also include methods that include the action of utilizing content including more complex audio properties so as to tax or otherwise exercise the recipient's cognitive ability to a greater extent than that which would otherwise be the case.

Figure 6:
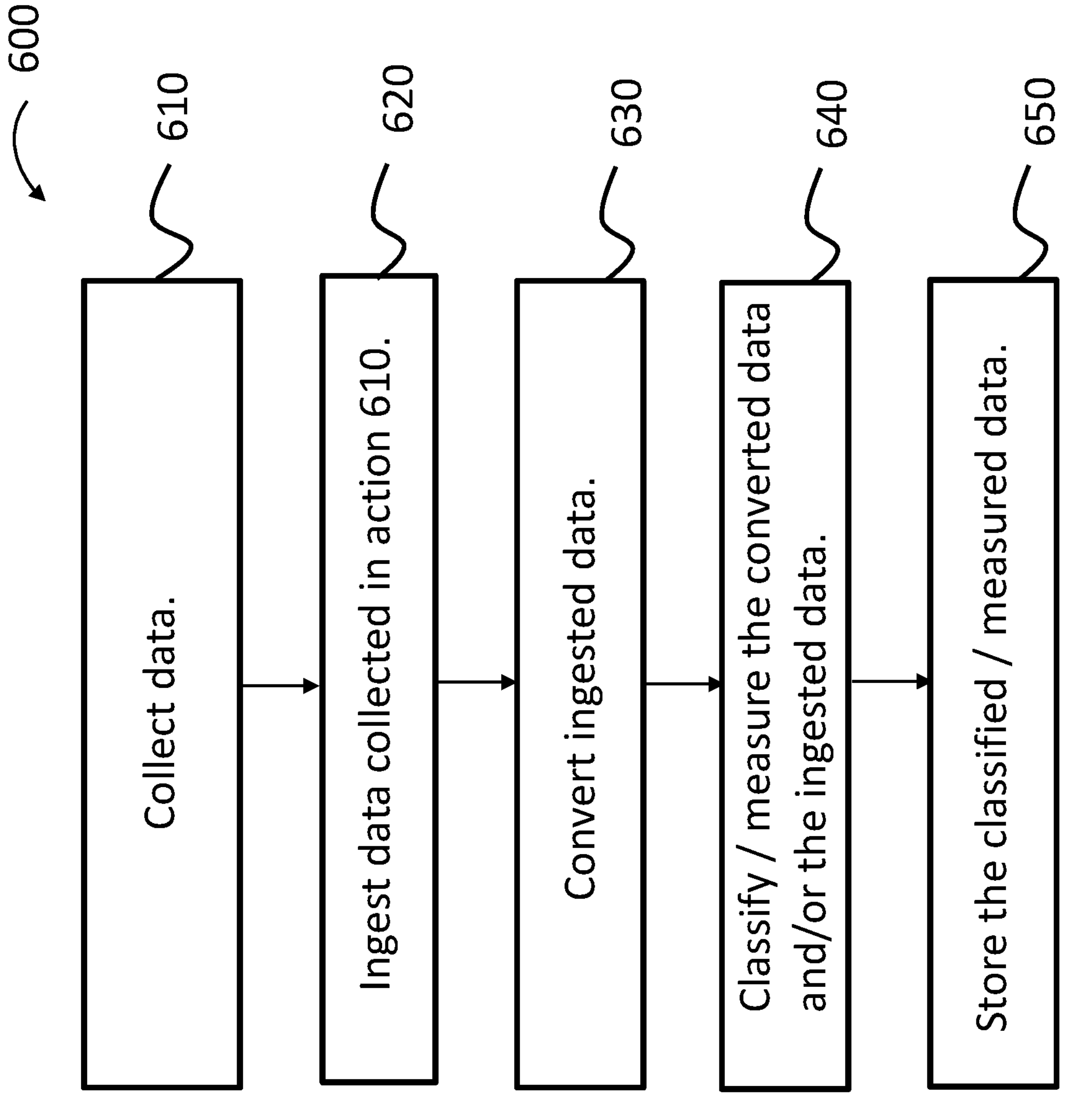
FIG. 6 presents an exemplary flowchart for an exemplary algorithm according to an exemplary embodiment.

More specifically, FIG. 6 presents an exemplary algorithm of operation of the search engine. FIG. 6 presents a method, method 600 which includes method action 610, which includes the collection of data. In an exemplary embodiment, a protocol, such as an RSS (Rich Site Summary) or another protocol, is utilized to subscribe to and download audio content. In an exemplary embodiment, method action 610 can include the utilization of an automated and/or a manual/curated content discovery mechanism.

By way of example, method action 610 can include the actions of accessing content on and/or updates to online content in a standardized, computer-readable format. In an exemplary embodiment, the user (whether human or automated or both) keeps track of 1 or 2 or 3 or more or very many different websites in a single or a plurality of news aggregators. These news aggregators are used to automatically check the RSS feed for new content, allowing the content to be automatically passed from website to website and/or from website to user. Indeed, in an exemplary embodiment, method action 610 is executed via the action of subscribing to a commercially available website RSS, while in other embodiments, a specifically developed RSS is utilized to implement method action 610. Accordingly, an exemplary embodiment includes developing an RSS to execute method action 610. A criteria in some exemplary embodiments, but not necessarily all, can include the utilization of a standard XML file format to ensure otherwise enhance compatibility with various machines/programs. In an exemplary embodiment, the RSS, whether commercial or developed for the specific purposes of executing method action 610, monitors various sites (in some instances constantly, while in other instances, in a periodic or semi-periodic or based on some form of temporally based manner and/or based on some form of data driven manner, etc.), and automatically identifies content and/or any updates. In at least some exemplary embodiments, the browser or other automated device, whether computer-based or otherwise, automatically downloads new data if found, or otherwise accesses the data in a manner that does not run afoul of copyright laws or the like, which access enables the other teachings detailed herein.

As noted above, in some embodiments, the RSS subscription can be utilized to identify or otherwise discover new audio content subscriptions. It is noted that in some embodiments, this may not necessarily be the case. Again, as noted above, in some instances, the database is set and that no further updates are made. Of course, in other embodiments, updates are made in a continual or semi-continual or in a periodic or any other manner that can have utilitarian value.

While the above embodiments have focused on an automated technique, in some other embodiments, method action 610 can be executed in a non-automated manner, or more specifically, in a human initiated manner. By way of example only and not by way of limitation, people can provide data to a common source on their own, such as via email, or via entering data onto a website that is configured to compile or otherwise collect the data. By way of example only and not by way of limitation, in an exemplary embodiment, a leading hearing prosthesis manufacturer provides a website that enables people to input data into the website in a manner analogous to that which results from the utilization of an RSS. It is also noted that both the automated and the manual regimes can be executed in combination with each other. Any device, system, and/or method that can enable the execution of method action 610 can be utilized in at least some exemplary embodiments.

Still with respect to method 600, in an exemplary embodiment, there is an integrated system that is configured to execute all of the method actions of method 600. Corollary to this is that in an exemplary embodiment, there is a system that is based on the algorithm of FIG. 6.

Thus, by executing method 600 and/or other methods detailed herein, indexing of audio properties for various items of content can be achieved.

Figure 7:
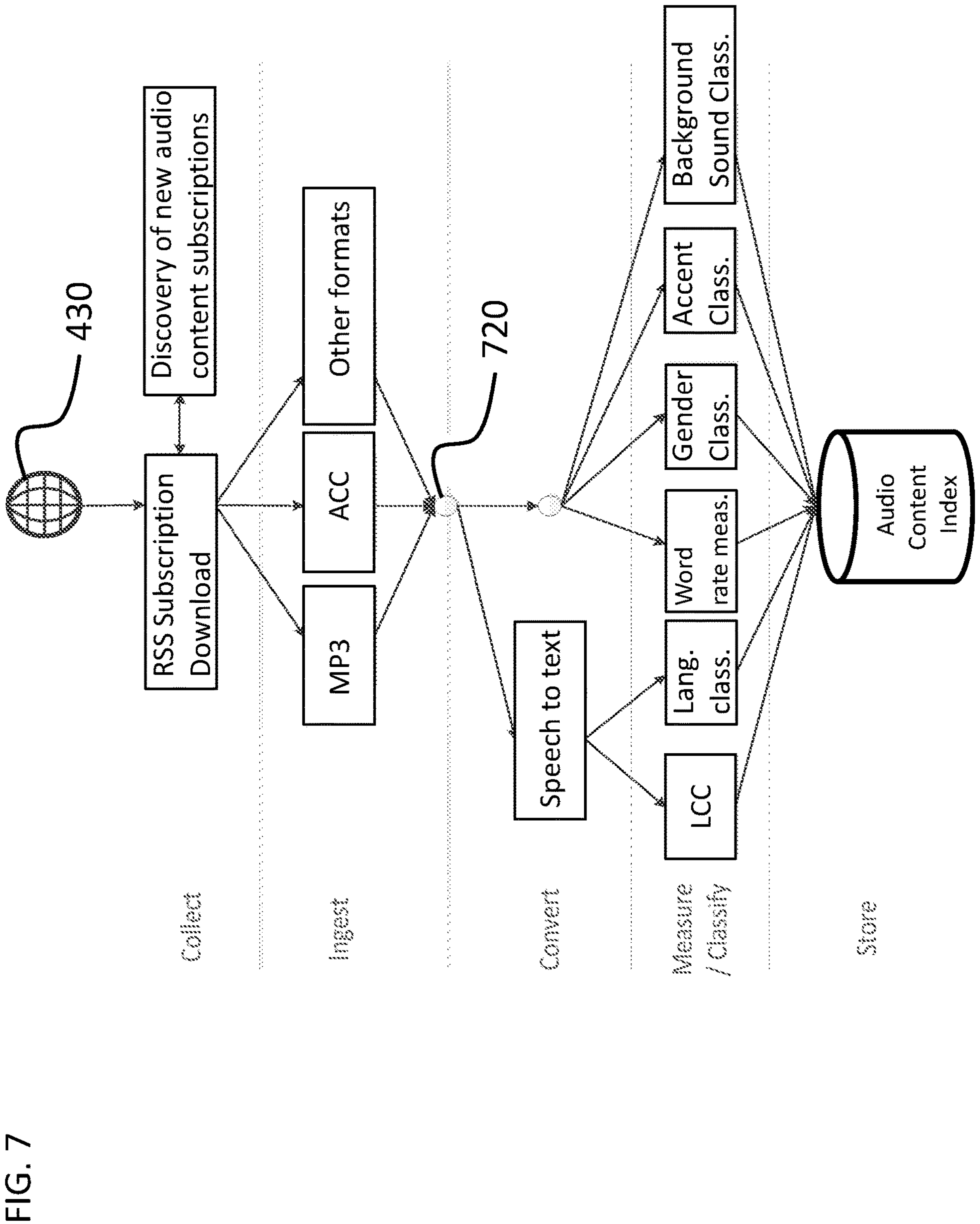
FIG. 7 presents an exemplary flowchart for an exemplary algorithm according to an exemplary embodiment.

FIG. 7 depicts an exemplary diagram integrating the method actions of method 600 with structure and/or functional devices/method actions that can enable method 600.

With reference back to FIG. 6, method 600 further includes method action 620, which includes the action of ingesting the collected data that was collected in method action 610. In an exemplary embodiment, method action 610 is executed by converting audio content from one or more formats and/or from a range of formats into a format that is utilized to enable the teachings detailed herein, such as by way of example, a standard format. With reference to FIG. 7, it can be seen that the various formats of the data collected in method action 610 can be, potentially, in a variety of audio coding formats, such as, for example, MP3 format, ACC formats, etc. Method action 620 thus can include adjusting these formats into a single format, such as, for example, ACC, if that is the format adopted to be the standardized format. The standardized format is conceptually represented by the symmetrical sphere 720 which conceptually represents the ability of anything located on a surface of the sphere to easily move to any other location, and thus represents the resulting compatibility of method action 620.

Method 600 also includes method action 630, which includes the action of converting the ingested data. In this regard, in an exemplary embodiment, the audio content that results from the formatting action of method action 620 is converted to text format or some other format that can have utilitarian value with respect to enabling the teachings detailed herein, which text format can be used by some of the classifiers downstream. Any audio to text recognition algorithm or system can be utilized. By way of example only and not by way of limitation, in an exemplary embodiment, the underlying programming of DragonTM or NexmoTM or variations thereof or other algorithms that accomplish the same and/or similar results can be utilized. Any device, system, and/or method of enabling method action 630 can be utilized in at least some exemplary embodiments.

It is also noted that while the conversion presented herein is indicated is speech to text, in other exemplary embodiments, other types of conversions can be executed. Indeed, in an exemplary embodiment, advanced techniques can be applied to visual data to analyze the clarity of the visual data and/or to develop data that can be used to classify (in method action 640) a correlation between the visual scenes in a video or the like and the text. By way of example only and not by way of limitation, in an exemplary embodiment, if actions are more correlated to text in some content then another content, the ease of understanding of the content should be greater, all other things being equal, at least for people that can see. Indeed, in some exemplary embodiments, such as a news broadcast or the like, where the people in the video are relatively stationary, a high definition video can be classified with respect to how well the lips can be seen moving, which can enable lipreading to be utilized, which should make it easier to understand the speech. In fact, the very concept of high definition video could be a factor in determining whether or not audio content is easier to hear. The focusing on the lips could be another factor.

Any type of conversion that can be utilitarian with respect to enabling the method action 640 and thus enabling the search user interface to implement the teachings detailed herein can be utilized in at least some exemplary embodiments.

That said, it is noted that in some exemplary embodiments, method action 630 is not executed. Indeed, it is noted that in at least some exemplary embodiments, one or more of the method actions detailed herein are specifically not executed in some of the methods and/or are excluded from execution in conjunction with one or more the other method actions detailed herein. In any event, as can be seen in FIG. 7, after the standardization of the formats (again, another example of a method action that need not necessarily be executed in some embodiments), some of the ingested data is not converted from speech to text, or, more accurately, method action 640 is executed in part utilizing data that has not been converted from speech to text (although some parts of method action 640 can be executed based on such converted data). More specifically, again with reference to method action 640, there is the action of classifying and/or measuring the converted data and/or the ingested data so as to extract filter properties from the content items (and in an alternate embodiment, method action 640 includes classifying and/or measuring the converted data based on the non-ingested formats (where action 620 was skipped, and the raw collected data is used) and/or based on the non-ingested formats without conversion (again, where action 620 was skipped).

With reference to FIG. 7, it can be seen that in some exemplary embodiments, a linguistic complexity classifier is utilized to measure/classify the converted speech to text. Also, in an exemplary embodiment, a language classifier is utilized to measure/classify the converted speech to text. It is noted that these are just two of the various ways in which the speech to text can be measured and/or classified. In an exemplary embodiment, any manner of classifying the speech to text which can have utilitarian value with respect to creating tags or otherwise cataloging or otherwise creating a hierarchy for the search user interface can be utilized in at least some exemplary embodiments.

Still with reference to FIG. 7, it can be seen that in some exemplary embodiments, word rate measurements, gender classification, accent classification, and/or background sound classification/measurement is utilized in method action 640. In an exemplary embodiment, these are executed against the non-converted format(s), while in other embodiments, these can also be applied to converted formats.

Note also that while the above exemplary embodiment regarding video was made in reference to converting the video to a format that could be analyzed and otherwise classified, in some other embodiments, the video is not converted, and method action 640 is executed based on the raw video. In any event, any manner of executing method action 640, whether on converted data or unconverted data, that can enable the teachings detailed herein can be utilized in at least some exemplary embodiments. To be clear, some embodiments explicitly measure/classify or otherwise analyze converted data, and some embodiments explicitly measure/classify or otherwise analyze nonconverted data, and/or a combination thereof, and method action 640.

Method 600 also includes method action 650, which includes storing the classified and/or measured data. In an exemplary embodiment, this can be stored in a memory, such as a computer memory, which can be, by way of example, a hard disk drive or an integrated circuit memory, etc. The memory can be located on a mainframe and/or in my server which is accessible via the Internet or via ethernet, or via RF technology, etc.

Method action 650 includes storing the data in a manner that is searchable or otherwise can be evaluated in a useful manner, concomitant with storing data in a database.

Briefly, method 600, or at least portions thereof, can be considered a method of ascertaining accessibility of audio content. In this regard, improved accessibility encompasses the design of products, services or environments such that they are more suitable for people with disabilities relative to that which would be the case in the absence of the improved accessibility. Corollary to this is that generic phrase accessibility can correspond to the level at which a given product service or environment is suitable for a person with a disability. By way of analogy, a ramp is more accessible to a person in a wheelchair than a flight of stairs. In view of this concept, exemplary embodiments of method 600, or at least portions thereof, are directed towards achieving a pseudo-design of a speech audio listening experience such that the content is to a hearing-impaired person. That is, in an exemplary embodiment, the result of method 600 is the cataloging of data based on how well it is suited to a person who is hearing impaired. For example, a hearing-impaired person may find it more difficult to listen to rapid or sophisticated language or to speech in an unfamiliar accent or gender. Such would be deemed to be less well-suited or otherwise not suited.

At least some exemplary embodiments of method 600 can be executed utilizing machine learning or the like. Expert systems can be applied to optimize the search process or the like so as to identify content that has utility with respect to implementing the teachings detailed herein. As will be described in greater detail below, in some exemplary embodiments, there are methods that include receiving feedback from recipients regarding the ease of which audio data of content can be comprehended. In an exemplary embodiment, this feedback can be utilized to train the machine learning to better categorize or otherwise identify content that can be utilized to execute the teachings detailed herein.

In some exemplary embodiments, the system that is utilized to execute at least part of method 600 can be analogous to the Google search engine or the like. In this regard, at least some of the teachings detailed herein can be executed utilizing algorithms that are modifications of the Google search engine.

In view of the above, it is noted that in at least some exemplary embodiments, the action of storing the classified/measured data can include storing only data that is accessible to a hearing-impaired person, statistically based, and eliminating or otherwise not storing data that is not accessible to a hearing-impaired person. For example, the algorithm of method 600 could eliminate as a matter of course rapid or sophisticated language or accented language. In this regard, in an exemplary embodiment, there can be a method action between method action 640 and method action 650 which can include evaluating the classified/measured data and triaging that data or otherwise vetting that data to remove non-accessible content or otherwise remove less accessible content relative to more accessible content. There can be an across-the-board threshold level for the various measurements and/or classifications which will bar that content from reaching the storage/database level. Alternatively, and/or in addition to this, there can be a sliding threshold level for the various measurements and/or classifications which will bar the content from reaching the storage/database. In an exemplary embodiment, if one criteria does not meet a threshold, the content is prevented from reaching the database. In an exemplary embodiment, even if one criteria does not meet a threshold, if the other criteria exceed a threshold by a certain level or otherwise a certain number of criteria meet a threshold and a certain number of criteria do not meet a threshold, if the number of criteria that meets the level and/or exceeds the level meets a given value, that content can reach the database even though it is deficient in one or more areas.

Any regime or otherwise any method of triaging or otherwise vetting the data before method action 650 can be utilized in at least some exemplary embodiments.

That said, in some embodiments, there can be utilitarian value with respect to providing content that is less accessible. In this regard, there are those that believe that providing difficult to understand (or at least relatively difficult to understand) audio content can improve the recipient's ability to hear over the long term, in that it will "exercise" the recipient. By rough analogy, running on a treadmill at a 10° angle will strengthen the person greater than that which will be the case at a 0° angle (discounting for fatigue, etc.). Thus, it is possible that content that is more difficult to understand will be stored in the database. Indeed, this can be utilitarian with respect to the exemplary embodiment of the search user interface that has the easy to hard scale, where during a scenario of use, the recipient puts the scale all the way to hard. Moreover, consider the exemplary scenario where a person who only speaks the English language has fallen madly in love with someone who has a very thick non-English accent that is more alien in the Anglosphere than others (a non-Romance language such as Chinese or Arabic, for example). This person, who happens to be a hearing-impaired person, might want to listen to content having Chinese or Arabic accents so that he or she can learn by practicing how better to hear the love of his or her life. Thus, there can be utilitarian value with respect to providing content that would be considered otherwise not desirable to be stored in the database or otherwise not accessible to a hearing-impaired person.

Corollary to the above is that in an exemplary embodiment, method 600 can be modified so as to actively seek out and otherwise find these less accessible audio contents.

Moreover, in some alternate embodiments, there are devices, systems, and/or methods that improve accessibility. By way of example only and not by way of limitation, in an exemplary embodiment, there can be the modification to the audio data of the audio and/or audio—video content such that the content becomes more accessible to a recipient of a hearing prosthesis relative to that which would be the case in the absence of such modification. For example, in some exemplary embodiments, the data is modified so that the playback of an audio file is slowed relative to that which would be the case in the absence of the modification in an exemplary scenario of such slowing, this can reduce the word rate. By analogy, this can be the equivalent of speaking the English language slower to somebody who is not a native English language speaker. Note also that in at least some exemplary embodiments, the data is not modified per se, but the device that presents the data to the recipient modifies the presentation.

In some exemplary scenarios, background sound and/or background noise is removed. In an exemplary embodiment, the signal-to-noise ratio is improved. These actions can be taken as modifications to the data or as modifications to the presentation of the data come, concomitant with the embodiment detailed above with respect to slowing word rate.

Another exemplary embodiment modifies gender and/or accent. In an exemplary embodiment, this can be executed by first converting the speech data to text and then converting the text to synthetic speech and/or having another person who speaks in a manner that is utilitarian with respect to the recipient at issue read the text. That said, in some embodiments, there may not necessarily be a speech to text conversion. Depending on the technology and/or the available resources, that could be a speech to speech conversion.

In some respects, there are methods herein that combine audiology and/or neurology with Internet search engines, with a goal of making a given topic/theme accessible to the recipient, or at least more accessible relative to that which would be the case in the absence of the teachings detailed herein. Note that this can be considered a slightly different paradigm than increasing availability, although the two are not mutually exclusive. Availability can correspond to increasing a quantity of a given thing, such as content related to a given topic. Accessibility can correspond to making more people able to access a single item within that topic. By way of example, in an exemplary embodiment, accessibility can be increased by adding subtitles and/or adjusting a background noise of the content. Still further, in an exemplary embodiment, accessibility can be increased by slowing down a speed at which audio content is conveyed relative to that which would normally be the case. Some additional ways in which accessibility can be increased or described in greater detail below.

The converse of the above is that in at least some exemplary embodiments, things that would otherwise adversely affect accessibility are utilized to enhance training. By way of example, subtitles can be removed from material that a recipient is otherwise familiar with (e.g., has heard before, or more accurately, seen before) so as to provide a stressor or otherwise make the content more difficult to comprehend, all other things being equal. The idea here is that in some instances, speech that is more difficult to comprehend can be used for training purposes to improve the recipient's ability to comprehend such speech, providing that the speech is not so difficult to comprehend that the recipient gives up or otherwise finds the exercise hopeless.

It is noted that the teachings detailed herein can be directed towards identifying content where the comprehension of the content, or more accurately, the audio data of the content, is greater than that which would otherwise be the case in the absence of the teachings detailed herein. The idea with respect to at least some exemplary embodiments is that if the content is more interesting or otherwise content in which the recipient is interested, the recipient will be more likely to engage or otherwise keep at the training. Thus, there is utilitarian value with respect to identifying content that is both interesting to the recipient and includes sound data that will meet a minimal comprehension threshold. To be clear, if the recipient cannot adequately comprehend the sound data of the content, it is less likely that the recipient will be interested in continuing the training or otherwise executing the training for sufficiently long periods of time.

Another way to characterize at least some exemplary embodiments is that content is identified that includes audio data that meets certain listenability requirements. Proxies for listenability "levels" can be derived from the aforementioned linguistic properties and/or audio properties. Collectively, in at least some exemplary embodiments, all of the aforementioned linguistic properties and/or audio properties combine to establish the listenability level of a given audio data of a given content. In this regard, in an exemplary embodiment, there is a method action that includes establishing criteria for listenability, and/or establishing respective criteria for respective levels of listenability, and a method action that includes identifying content having audio data corresponding to one or more of the respective levels of listenability. Depending on where the recipient is located during his or her hearing journey and/or the willingness of the recipient to engage in more strenuous training, content having audio data with a given listenability level will be provided to the recipient, the idea being that by matching a listenability level with a recipient's mental state and/or with a recipient's level of habilitation and/or rehabilitation, the recipient will remain engaged in the training/retraining relative to that which would be the case in the absence of the teachings detailed herein.

Any device, system and/or method that can enable an evaluation of the listenability of content that can have utilitarian value with respect to the teachings detailed herein can be utilized in at least some exemplary embodiments. Any metric of such or any other metric that can have utilitarian value with respect to identifying content that can aid the cochlear implant recipient (or any other recipient of a hearing prosthesis) in habilitation and/or rehabilitation can be utilized. By way of example only and not by way of limitation, there can be utilitarian value with respect to evaluating content with respect to the rate of speech and/or the number of pauses in between words and/or sentences and/or utterances, etc. If the rate of speech is slow and/or the number of pauses is relatively high relative, the content that might be easier to understand, and such can result in the identification of this content as being utilitarian for the purposes of habilitation and/or rehabilitation. (Conversely, with respect to embodiments that strive to tax or otherwise challenge the recipient, there can be utilitarian value with respect to utilizing subject matter that has a higher speech rate and a lower pause rate.) Corollary to this is that in at least some exemplary embodiments, there can be utilitarian value with respect to modifying content to slow the rate of speech and/or insert meaningful pauses so as to enhance listenability. Note also that in at least some exemplary embodiments, content can be evaluated with respect to whether or not the content conforms to a dialogue as opposed to a lecture or a news broadcast. In this regard, in an exemplary embodiment, dialogue can sometimes be easier to listen to than content presented in the letter features. Accordingly, embodiments can include identifying content that is more dialogue and less lecture and provide such to the recipient. Of course, it is noted that any of these features can be utilized in the overall evaluation is to assess the overall listenability of the content to determine whether or not such is utilitarian with respect to habilitating and/or rehabilitating the recipient.

Moreover, in at least some exemplary embodiments, other features can be evaluated, such as features that are unique to spoken language that affect language processing. By way of example, prosodic features such as stress, intonation, etc., can be utilized as part of the evaluation process to determine or otherwise identify content have utilitarian value with respect to habilitation and/or rehabilitation. Note further that in at least some exemplary embodiments where the content is modified, certain words and/or phrases can be modified so as to have these prosodic features. Note also that in at least some exemplary embodiments, dysfluency features, such as, for example, pauses, repetitions, can be utilized to evaluate the listenability of available content. Again, consistent with some embodiments, the content can be modified to add these pauses and/or to include repetitions. In this regard, in at least some exemplary embodiments, content can be provided that has this repetition and/or has the pauses by way of content manipulation.

In an exemplary embodiment, automated methods for predicting sentence level listenability can be utilized at least some exemplary embodiments. By way of example only and not by way of limitation, the arrangement detailed in Kotani (Katsunori Kotani, Shota Ueda, Takehiko Yoshimi and Hiroaki Nanjo, 2014, a listenability measuring method for adaptive computer-assisted language learning and teaching system—In proceedings of the 28$^{th}$ Pacific Asia conference on language, information and computation, pages 387-394), and/or variations thereof, can be utilized in at least some exemplary embodiments. In at least some exemplary embodiments, systematic methods of measuring the difficulty of spoken texts using natural language processing (NLP) can be utilized at least some exemplary embodiments. It is noted that in at least some exemplary embodiments, the production of listenability can be based on a sentence by sentence analysis and/or can be based on a multiple sentence analysis. These can be executed in an automated fashion. That said, in some alternate embodiments, an "off the cuff" analysis can be made by a manual operation or otherwise based on input/feedback arrangements from users of cochlear implants who previously utilize the content as part of a habilitation and/or rehabilitation regime.

In at least some exemplary embodiments, linguistic features that are associated with the perceived difficulty of spoken text, based on empirical results from studies, for example, are utilized in at least some exemplary embodiments, to evaluate the listenability of the content. At least some algorithms utilize one or two or three or four or five dimensional measurements. By way of example only and not by way of limitation, in at least some exemplary embodiments, an algorithm that has utilitarian value with respect to predicting the listenability of content utilizes an acoustic dimension, a lexical dimension, a grammatical dimension and/or a discourse dimension. The algorithm can analyze the content for one or more these dimensions and develop a score or otherwise a metric with respect to the listenability of the content. Based on this, content can be provided to the recipient that corresponds to the desired listenability.

By way of example only and not by way of limitation, with respect to the acoustic dimension, in some embodiments, the speaking rate in words per second is evaluated. Still further, the number of silences per word can be evaluated, the mean deviation of speech chunk can be evaluated, the mean distance between stressed syllables in seconds can be evaluated, and/or variations in bowel durations can be evaluated. In an exemplary embodiment, these can be correlated with average human difficulty ratings or the like vis-à-vis listenability. With respect to vocabulary, in an exemplary embodiment, the number of noun collocations per clause can be evaluated, the type token ratio can be evaluated, normalized frequency of low frequency words can be evaluated and/or average frequency of word types can be evaluated, again to develop a correlation with average human difficulty rating vis-à-vis listenability. With respect to grammar, the average words per sentence can be evaluated, the number of long sentences can be evaluated, and the normalized number of sentences can be evaluated, and one or more all can be correlated with average human difficulty ratings vis-à-vis listenability.

Again, in some embodiments, fluency of the audio content can be evaluated. In this regard, features can measure the degree of fluency in a speech flow. For example, the speaking rate and the average length of speech chunk without dysfluencies can be evaluated. The number of pauses or the types of pauses can be evaluated. For example, the characteristic of silent pauses and speech can be captured such as, for example, the duration of silent pauses per word, the mean of silent pause duration and where the number of long silent pauses. Moreover, prosodic features can be evaluated. For example, some features can measure the rhythm and/or duration variations in speech. By way of example only and not by way of limitation, the mean distance between stressed syllables in syllables and/or the relative frequency of stressed syllables, can be evaluated. All of the above or any of the above are some of the above and some embodiments can be compared to empirical and/or statistical data associated with listenability, so as to evaluate a degree of listenability of a given audio content. Such can be compared for purposes of implementing the teachings detailed herein.

It is noted that in at least some exemplary embodiments, an automated system and/or method and/or the systems and/or methods detailed or otherwise used by Su-Yoon Yoon and/Yeonsuk Cho and Diane Napolitano, as detailed in Spoken Text Difficulty Estimation Using Linguistic Features, as detailed in the proceedings of the 11$^{th}$ workshop on innovative use of an LP for building educational applications, pages 267-276, San Diego California, Jun. 16, 2016, Association for computational linguistics, can be utilized at least some exemplary embodiments to ascertain or otherwise evaluate the listenability of a given content, and determine the utilitarian value for such with respect to habilitation and/or rehabilitation.

To be clear, in at least some exemplary embodiments, there are devices, systems and/or methods that result in applying at least one or more of the teachings detailed herein associated with evaluating the listenability of content and utilizing such to determine whether or not the content should be made available to the recipient. It is also noted that in at least some exemplary embodiments, there are devices systems and/or methods of modifying or otherwise altering content to enhance listenability or to reduce listenability by modifying the content with respect to one or more of the aforementioned features of listenability detailed herein, providing that the art enables such.

Some more embodiments will now be described.

Figure 8:
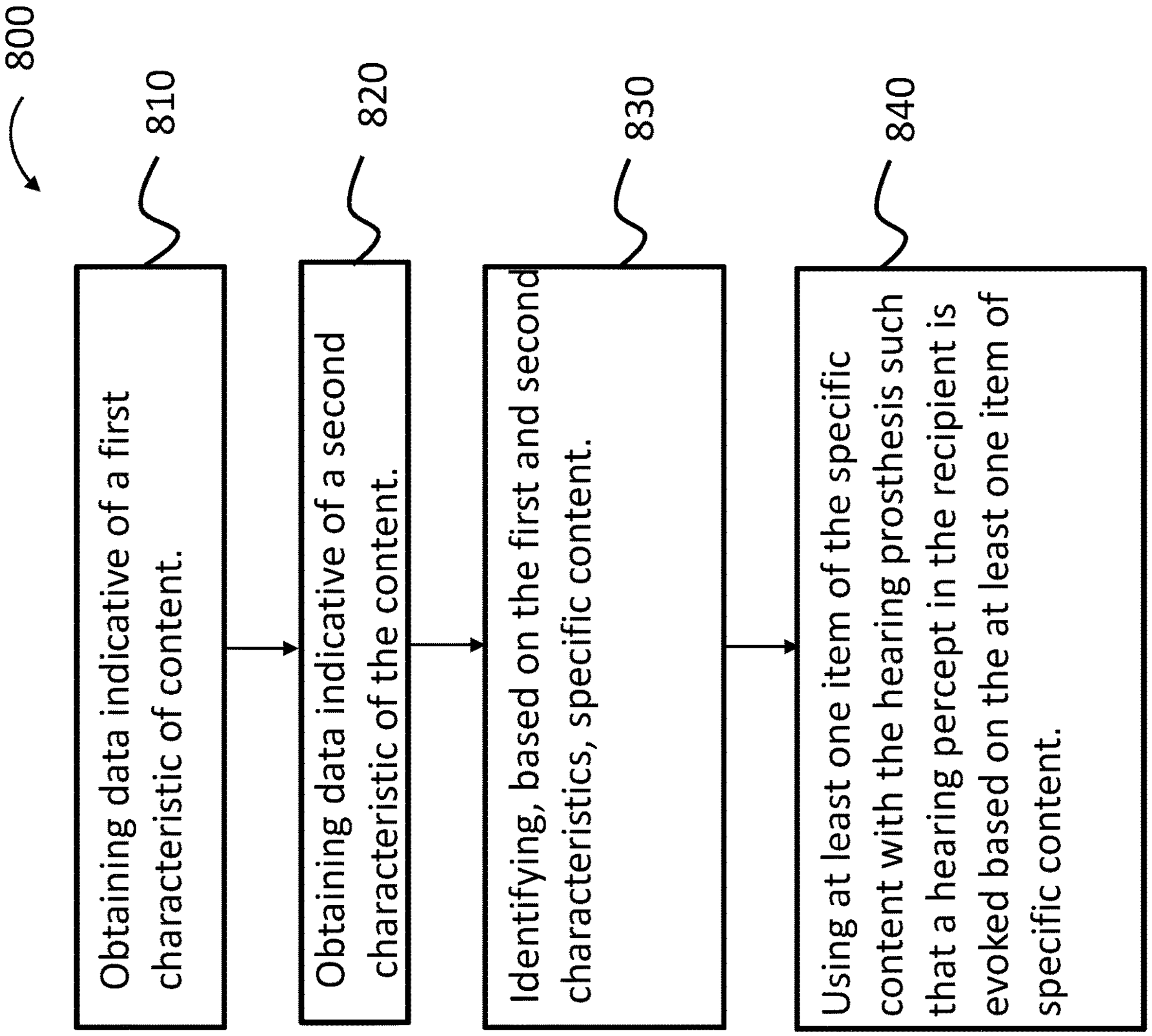
FIGS. 8-13 present exemplary flowcharts for exemplary algorithms according to exemplary embodiments.

FIG. 8 provides an exemplary algorithm for an exemplary method, method 800, which is a method of improving a recipient of a hearing prostheses' ability to hear with the hearing prosthesis. Briefly, a recipient of a hearing prosthesis, such as a cochlear implant, may have difficulty with respect to listening to certain content relative to other content. By way of analogous example, if we take a 100 channel cable television set up, at any given time, it may be the case that only 5 or 10 or 20 or even fewer than 5 channels that are broadcasting content with an audio data that a new recipient of a cochlear implant (e.g. someone who has received the implant within the past year or so) could reasonably comprehend or otherwise use with respect to a hearing paradigm that is not utterly taxing to the recipient and/or can be followed in a meaningful manner. The analogy to method claim 800 is to identify the 10 or 20 content items from the 100 channels, but method 800 is not limited to just those 100 channels, but instead can be, in some embodiments, all possible content that is publicly available to the recipient (whether free or via purchase or subscription, etc.). (Again, we are talking by analogy to simply set up a framework where the 100 channels is analogous to all of the available content in the world.)

In this regard, method 800 includes method action 810, which includes obtaining data indicative of a first characteristic of content, wherein the content is an audio or an audio-visual content. The first characteristic of content can be one or more linguistic properties and/or one or more audio properties of the content. Some more specific examples of such are described below.

Still with reference to FIG. 8, method 800 also includes method action 820, which includes obtaining data indicative of a second characteristic of the content. Here, in this exemplary embodiment, the second characteristic of the content can be the topic or the type of content or the subject of the content (these may not be mutually exclusive) that is desired by the recipient (or by the care giver or by someone who is helping the recipient to better hear or otherwise to function—this could be a recipient's parents or the recipient's significant other or a healthcare professional etc.—to be clear, embodiments include a parent or the like, for example, identifying the first and second characteristics and providing such to healthcare professional or a service provider utilizing or otherwise executing method 800).

Method 800 also includes method action 830, which includes identifying, based on the first and second characteristics, specific content. As will be described in greater detail below, and also as was described above, in some embodiments, there is a database of catalogued audio and/or audiovisual content that was developed based on listening attributes. In an exemplary embodiment of method action 830, the first and second characteristics are used to identify a subset of the catalogued audio and/or audiovisual content. That said, also as will be described below, in some embodiments, method action 830 can be executed by real time or semi-real-time analysis of content to identify features of the content and compare the content to the first and second data to obtain the specific content.

In some embodiments, the specific content can be one or more content items. In the case of more than one content items, a list can be provided to the recipient, where, in some embodiments, the list can be hierarchical based on some data feature(s). For example, primacy can be given to feature(s) that are more important to the recipient relative to other features. In an exemplary embodiment, let us say that specific content items 1 to 10 are identified as meeting the predetermined criteria. If items 8, 7, and 3 have the lowest word rate, those could be provided first on the list. If items 3 and 4 are identified as having speech associated with the gender that is important to the recipient, those items could then be listed (if that is a secondary important feature—in some embodiments, if the two overlap, that specific content item could be put first and foremost). Items where the gender is inconclusive could then be listed, and in items where the gender is different than that which is desired could be provided are presented last.

Any device, system, and/or method of triaging the identified specific content can be utilized in at least some embodiments.

Method 800 further includes method action 840, which includes using at least one item of the specific content with the hearing prosthesis such that a hearing percept in the recipient is evoked based on the at least one item of specific content. By way of example only and not by way of limitation, in an exemplary embodiment, a recipient could go seek out a specific content item. For example, the recipient could go to a content service provider and download or otherwise access a movie that corresponds to a specific content item that resulted from the method action 830. Alternatively, the method could be executed with respect to current programming or future programming on a cable television system and/or a satellite television system and/or a satellite music system, etc., or the specific content identified can correspond to the material that is presented on certain channels as opposed to other certain channels.

In some embodiments of method 800, the specific content is directly provided, including automatically directly provided, to the recipient via a web access system or via email, etc., as opposed to having to affirmatively access the content via a separate action. Indeed, in some embodiments, the recipient's audio and/or audiovisual device can automatically obtain the content or otherwise switch channels to access that content.

Still, it is noted that in the broadest sense, method 800 does not require interaction between a content service provider and a recipient or the person executing that method. Indeed, in an exemplary embodiment, the content can be previously obtained by the recipient or the user (e.g., the recipient can have a library of 1000s of DVDs, or electronic files of content, etc.). The method can be tailored to identifying the content from the content that is currently owned or otherwise accessed by the user. Indeed, in an exemplary embodiment, the teachings detailed herein can be executed such that a library is built up over time, where the recipient can re-watch or relisten to content, where the specific content can be identified according to method 800.

In an exemplary embodiment, the first characteristic is a sound related characteristic. Concomitant with the teachings detailed above, the sound related characteristic can be a word rate, gender, accent, linguistic complex of the and/or background sound characteristic. Any other sound related characteristic that can have utilitarian value with respect to enabling the teachings detailed herein can be utilized in at least some exemplary embodiments. Moreover, it is noted that method 800 is not limited to a single sound characteristic. In an exemplary embodiment, in some instances, all five of the aforementioned characteristics can be obtained in an implementation of method 800.

In an exemplary embodiment, the second characteristic is a content topic characteristic. By way of example only and not by way of limitation, as detailed above, the topic can be mystery stories, romance stories, action, drama, comedy, etc. The content topic can also be vocalized music, documentary, fantasy, etc. The content topic could be news, sports, weather, etc. The second characteristic can be any characteristic with regard to the substantive content (as opposed to the sound content, for example), that is of interest to the recipient and/or the user.

In an exemplary embodiment, the first characteristic is one of a linguistic complexity, a language characteristic, a word rate, a gender of speaker or a background noise characteristic. Still, it is noted that the first characteristic is not limited to these characteristics.

Figure 9:
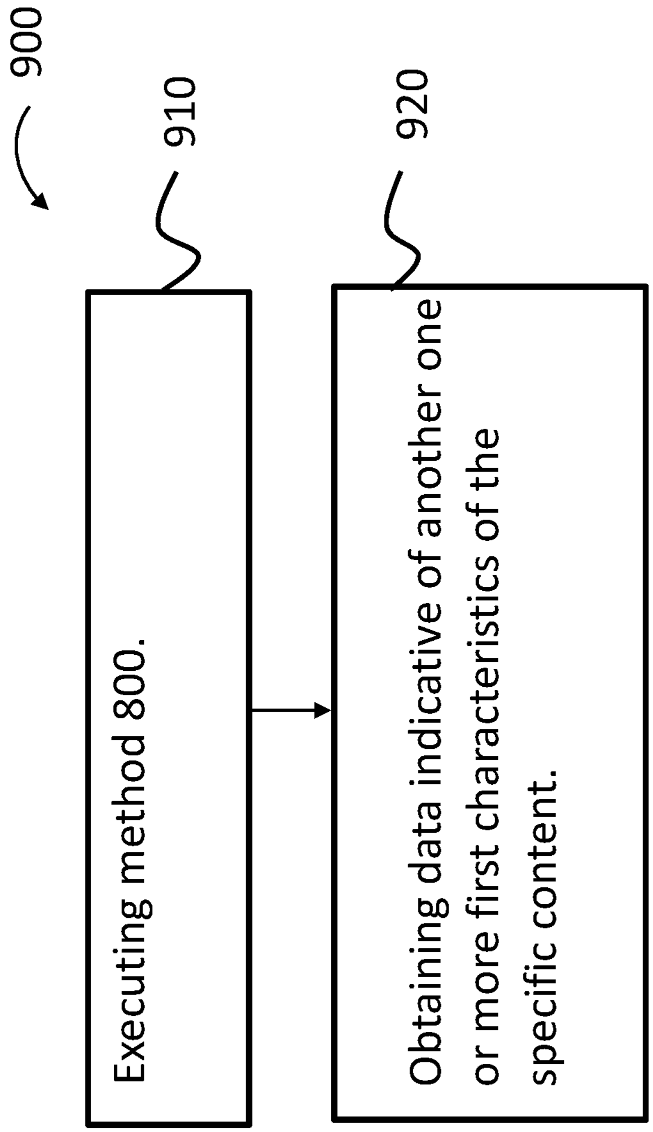

Again, as noted above, in some exemplary embodiments, more than one first characteristics are obtained. In this regard, FIG. 9 includes an exemplary method, method 900, which includes method action 910, which includes executing method 800. Method 900 also includes method action 920, which includes obtaining data indicative of another one or more first characteristics of the specific content. It is noted that method action 920 can be executed before method action 800 is completely executed. In this regard, it is noted that at least some exemplary embodiments include embodiments where any method action disclosed herein can be executed in any order with respect to any other method action disclosed herein providing that the art enables such and that a utilitarian result would exist, unless otherwise specified.

Still with respect to method 900, in an exemplary embodiment, the plurality of first characteristics include any one or more of the aforementioned characteristics.

It is noted that in some exemplary embodiments, the aforementioned first characteristics need not necessarily be open ended limitations. For example, in a scenario where word rate is utilized or the like, it is possible that an upper and lower boundary can be provided. For example, a lower boundary in an upper boundary of the word rate could be applied simultaneously.

As noted above, in some exemplary embodiments, the user experience can be streamlined or otherwise simplified by offering a single input option that aggregates some of the various sound characteristics detailed above. In this regard, in an exemplary embodiment, the first characteristic can be an ease of listening characteristic. As will be described in greater detail below, this characteristic can be inputted into a device that is utilized to implement method 800 by sliding a virtual button from easy to difficult, such as on the screen of the GUI seen in FIG. 5. In an exemplary embodiment, this characteristic can be an absolute characteristic which is meaningful in and of itself based on a standard, while in other embodiments, this characteristic can be an amalgamation of two or more of the sound characteristics in some form of weighted fashion. By way of example, content with a low word rate, no accents (relative to the native language of the recipient), a low linguistic complexity level, and low background sound characteristics can be characterized as easy, whereas the opposite of these can be characterized as hard. Indeed, more accurately, in some instances, again with respect to the action of obtaining data indicative of the first characteristic, the first characteristic could be easy, and then the content that is proffered could be content that has a low linguistic complexity level, a low background sound characteristic, a low word rate and no accents. This may not necessarily be identified as easy, but the algorithm that identifies such would utilize these qualifiers when the first characteristic of ease of listening is received and at first characteristic is easy listening. The opposite could be the case with respect to a scenario where the first characteristic of ease of listening is received and the first characteristic is hard listening. Also, it is noted that in some embodiments, a middle ground for a plurality of staggered middle grounds can exist.

In keeping with the concept that the first characteristic can be a ease of listening characteristic, while the following is not limited to this embodiment, in an exemplary embodiment, method 800 further includes the action of correlating the first characteristic to a statistically based qualifier, wherein the qualifier is based on statistical data indicating that people with a hearing prosthesis and/or demographic characteristics of the recipient will be able to comprehend speech in the specific content. By way of example only and not by way of limitation, over time, a data set can be developed based on feedback from recipients or from people associated with the recipient or otherwise based on profile data (e.g., how many times a content item was used relative to others in the same topic, etc.) that can be correlated to a quantifiable and/or a quantifiable characteristic(s). Thus, when a recipient inputs that he or she wants to have a middle ground ease of listening content item, specific content can be identified based on the statistically compiled qualities and/or quantities. By way of example only and not by way of limitation, if data indicates that the movie Star Wars is difficult to listen to (e.g., there is a lot of background noise—typically laser gun fire and spacecraft noise, and the howling from the tall creature known as the Wookie might be confused for speech), the movie Star Wars would be classified as a hard to listen to content item. The Wizard of Oz might be a middle ground ease of listening item (the high pitch of the munchkins at the beginning might cause difficulty, but the dialogue is relatively straightforward in other instances, at least the digitally remastered versions—indeed, embodiments can push the recipient towards the digitally remastered versions versus the original versions). The movie Cast Away might be an easy listening item, in view of the fact that the dialogue is limited (relatively) and precise and slow, and the speaker has an excellent voice. Another movie that might meet the easy listening criteria is the movie The Martian, for potentially similar reasons as the movie Cast Away. People who viewed these movies who utilize hearing prostheses could have provided feedback and thus the statistical data related to these movies can be utilized. Conversely, these movies could be analyzed via a professional and/or via an automated system.

Note also that in an exemplary embodiment, additional qualifiers can be utilized. For example, a qualifier could eliminate foul language or violence etc. and/or a qualifier could indicate an age bracket for the suitability of the content. In this regard, while the movie The Martian might be an easy movie to which to listen, some of the specific language might exclude the movie from the results.

Figure 10:
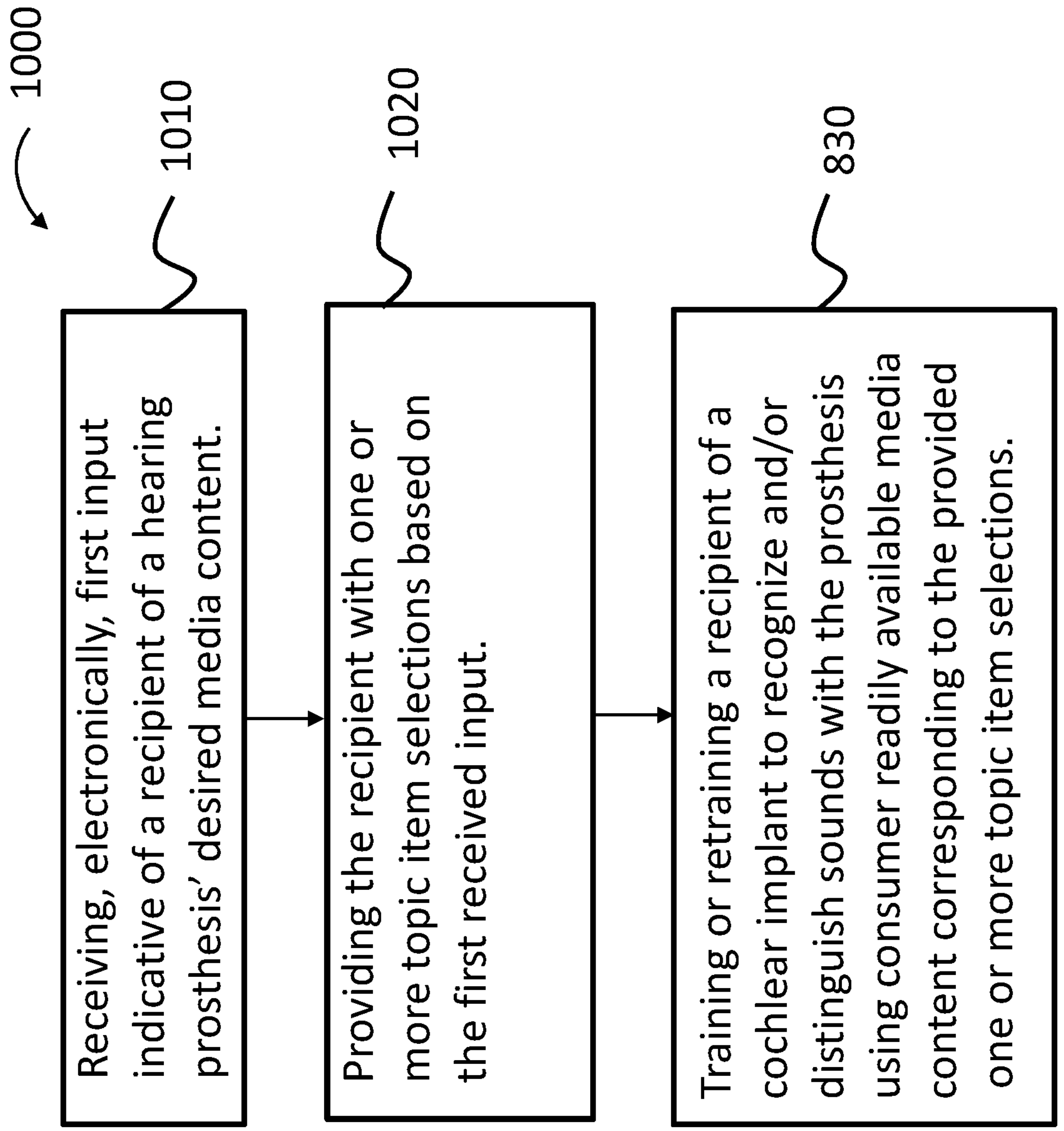

FIG. 10 presents another exemplary algorithm for an exemplary method, method 1000, which includes method action 1010, which includes receiving, electronically, first input indicative of a recipient of a hearing prosthesis' desired media content. In an exemplary embodiment, the first input can be received via, for example, the smart phone 510 detailed above, or via another device, such as a personal computer. That said, the first input can be received via a phone via an audio signal of the like. Method 1000 also includes method action 1020, which includes providing the recipient with one or more topic item selections based on the first received input. This can be executed electronically in at least some exemplary embodiments. Method 1000 also includes method action 1030, which includes training or retraining a recipient of a cochlear implant to recognize and/or distinguish sounds with the prosthesis, using consumer readily available media content corresponding to the provided one or more topic selections, wherein the training or retraining increases a training compliance relative to that which would be the case in the absence of the first input. In this regard, in an exemplary embodiment of method 1000, the action of providing the recipient with one or more topic item selections is executed by skewing or otherwise purposely providing the recipient with topic item selections that are recognized by the party performing the action of providing as being conducive to enhancing training compliance and/or are recognized by the party performing the actions as being relatively easy to hear relative to other possible items that could be provided. Indeed, in an exemplary embodiment, the above-noted statistical database can be utilized to identify items that can be proffered to the recipient in response to the recipient's input regarding the desired media content. Again, in an exemplary embodiment, if the recipient desires drama content, the party executing the action of providing can provide movies that are drama themed that also include subtitles. In an exemplary embodiment, if the recipient is seeking to obtain educational media content, the actor executing the action of providing can provide, for example, items from Ted Talks, which items can have subtitles. In this regard, based on experience/statistical data, the actor executing method action 1020 will have recognized that such items are conducive to increasing compliance on a training regime relative to that which would be the case in the absence of the subtitles. Hence, the actor executing method action 1020 provides such items as opposed to other items.

In view of the above, as can be understood, in at least some exemplary embodiments, there are methods of enhancing habilitation and/or rehabilitation compliance, by, in an exemplary embodiment, driving compliance with respect to providing the recipient with content that makes the recipient more likely to continue with the training relative to that which would otherwise be the case. As will be described in greater detail below, in some embodiments, embodiments can include manipulating the total sound scene so as to drive compliance.

Figure 11:
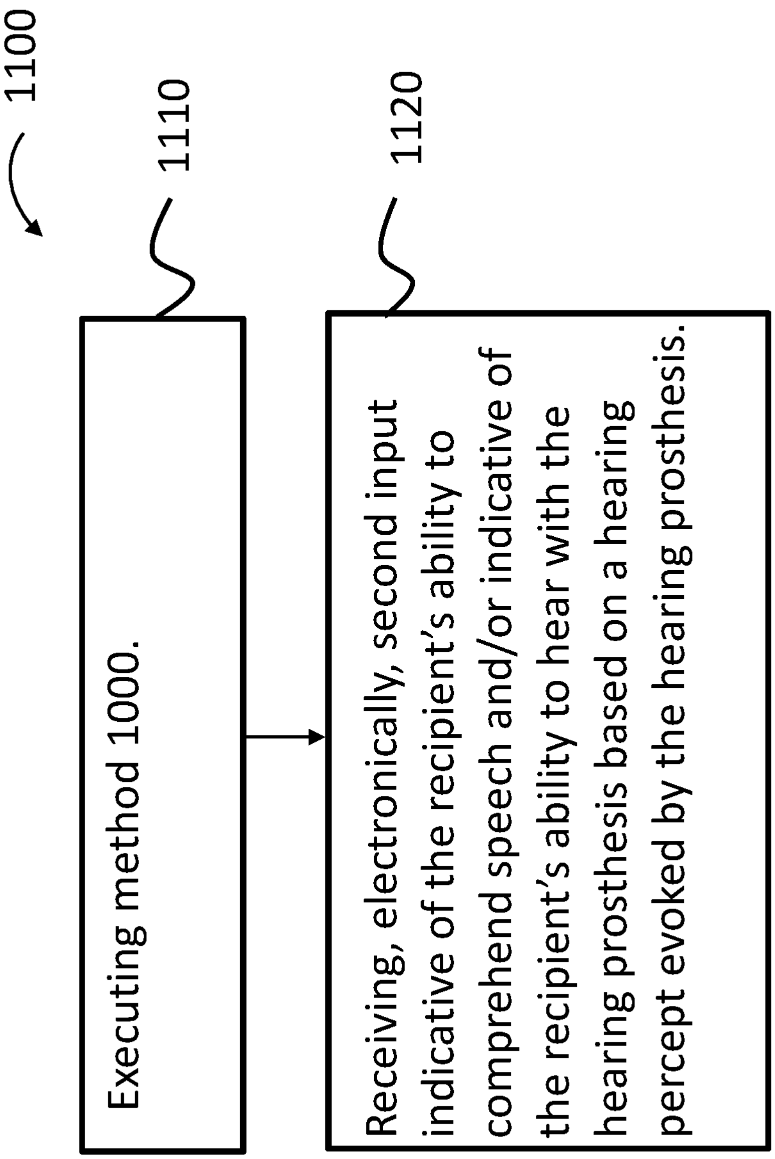

FIG. 11 presents an exemplary flowchart for an exemplary method, method 1100. Method 1100 includes method action 1110, which includes executing method 1000. Method 1100 also includes method action 1120, which includes the action of receiving, electronically, second input indicative of the recipient's ability to comprehend speech and/or indicative of the recipient's ability to hear with the hearing prosthesis based on a hearing percept evoked by the hearing prosthesis. As detailed above, method actions herein can be interleaved with other method actions and the flowcharts do not necessarily require a temporal order as would otherwise be indicated based on a top to bottom read. In this regard, in an exemplary embodiment, method action 1120 can be executed before method action 1020 when executing method 1000 in conjunction with method action 1020 (i.e., when executing method 1100).

Figure 12:
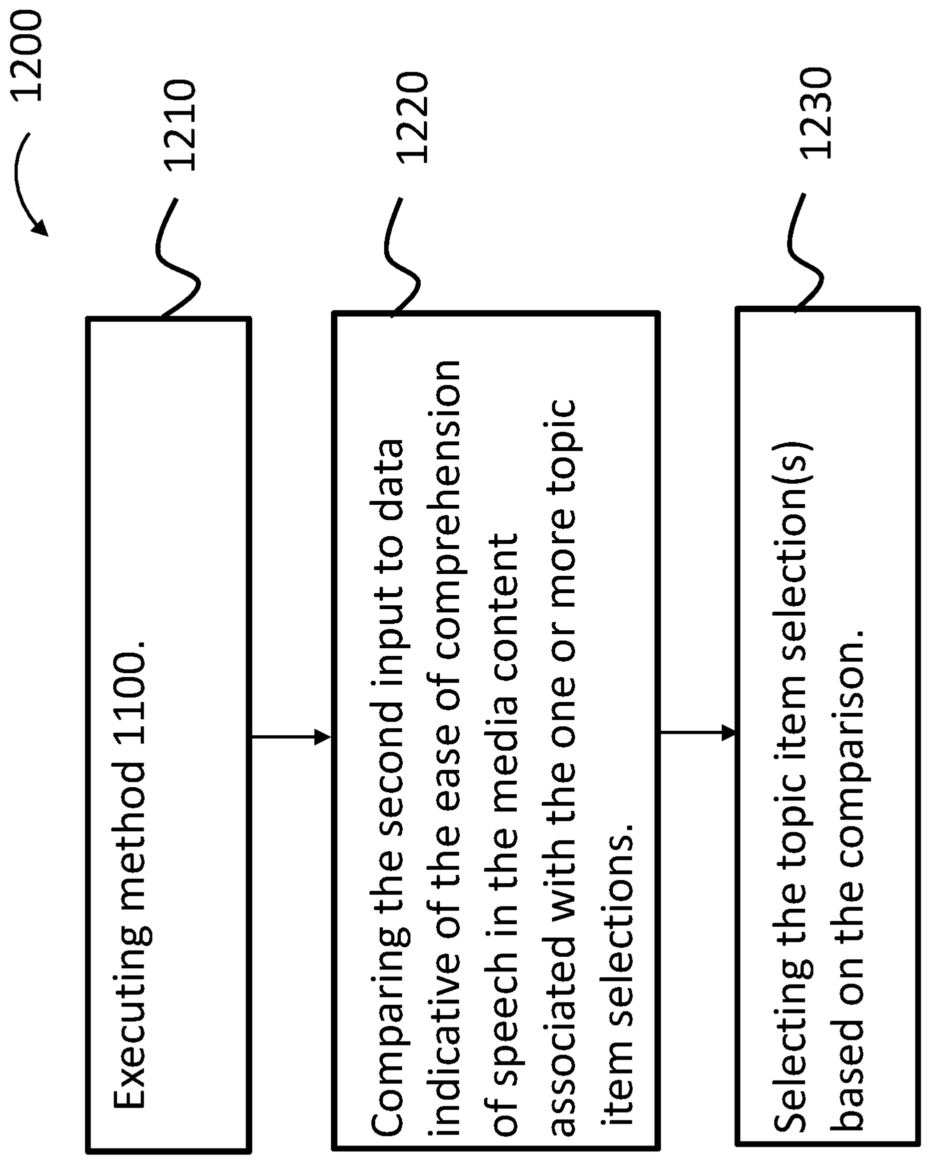

It is noted that method action 1120 can be executed by receiving any one or more of the data detailed above, such as the word rate, gender, accent, linguistic complexity and/or the background sound characteristics. All of these are indicative of the recipient's ability to comprehend speech and/or the recipient's ability to hear with the hearing prosthesis albeit these might be considered latent variables associated therewith. Again, in some alternate embodiments, the second input can simply be a characterization of the recipient's ability to hear and/or comprehend on, for example, a scale of 1 to 10, or something like terrible, poor, fair, good, excellent, and near perfection. Any qualitative and/or quantitative indicia that can be utilized to implement method action 1100 can be utilized in at least some exemplary embodiments FIG. 12 presents another exemplary algorithm for an exemplary method, method 1200. Method 1200 includes method action 1210, which includes executing method 1100. Method action 1200 also includes method action 1220, which includes comparing the second input to data indicative of the ease of comprehension of speech in the media content associated with the one or more topic item selections. Again, this data indicative of the ease of comprehension of speech can be word rate, gender and/or accent, etc. Any of the features detailed herein can be utilized. Conversely, the data can be based on the statistical analysis detailed above and/or can be a combination of both. In an exemplary embodiment, the comparison can be made via a computer that searches a database or the like for content that meets or otherwise corresponds to the second input data.

Method 1200 also includes method action 1230, which includes selecting the topic item selection(s) based on the comparison. In an exemplary embodiment of method 1200, the provided one or more topic item selections corresponds to the selected topic item selection(s).

It is noted that method 1000 and/or 1100 and/or 1200 or any other method detailed herein where, at least, the method is executed by a party other than the recipient, can be executed for a plurality of different recipients of hearing prostheses. In an exemplary embodiment, method 1100 for example can be executed for 2, 3, 4, 5, 6, 7, 8, 9, 10, 11, 12, 13, 14, 15, 16, 17, 18, 19, or 20 or more recipients. In an exemplary embodiment, methods 1000, 1100, and/or 1200 or any other method detailed herein can be executed for N number of recipients, where N is any integer value between 1 and 1,000,000 or any value or range of values therebetween in one integer increments (e.g., 77, 745, 987,111, 4,444 to 340,991, 10,000 to 100,000, etc.). N can be larger in some embodiments as well. In an exemplary embodiment, where the methods are executed for N different recipients and/or N number of times (which could include a plurality of times for a given recipient), the increased training compliance is at least X % greater, on average (mean, median and/or mode), relative to that which statistically would have been the case in the absence to the respective second inputs (for methods 1100 and/or 1200), where X is 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 65, 70, 80, 90, 100, 120, 140, 160, 180, 200, 225, 250, 275, 300, 350, 400, 450, 500, 550, 600, 650, 700, 750, 800, 850, 900, 1000, 1100, 1200, 1300, 1400, 1500, 1750, 2000, 2500, 3000, 3500, 4000, 4500, 5000, 6000, 7000, 8000, 9000, 10000, 12500, 15000, 17500, or 20000, or any value or range of values therebetween in increments of 1 (X can be greater than these numbers in some embodiments). It is noted that the training compliance can be an apples to apples evaluation. In other words, subjective and/or objective standards can be developed or otherwise already exist, and the compliance can be scored accordingly. The compliance can be based on temporal measurements (e.g., how long the recipient engages in the training), quantitative measurements (how many times the recipient engages in the training), qualitative measurements (is the recipient truly training, or just going through the motions), etc. any indicia that can be utilized to measure the compliance can be utilized in at least some exemplary embodiments.

Consistent with the teachings detailed above, some embodiments detailed herein are directed towards vetting or otherwise eliminating media content from a pool of media content to obtain a remainder of media content that is more conducive to training or otherwise hearing comprehension by people with cochlear implants. In this regard, in an exemplary embodiment, the readily available media content corresponding to the desired media content is such that at least Y % of the content is unsuitable for the training, where Y can be 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 45, 50, 55, 60, 65, 70, 75, 76, 77, 78, 79, 80, 81, 82, 83, 84, 85, 86, 87, 88, 89, 90, 91, 92, 93, 94, 95, 96, 97, 98, or 99 (or more). Further, in an exemplary embodiment, any of the methods detailed herein that are applicable to these values are such that the method further comprises vetting at least a substantial portion of the at least Y % from the provided one or more topic selections, where the portion vetted can be all or part of Y (the percent of Y vetted out can be Z %, where Z can be more than 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 65, 70, 75, 76, 77, 78, 79, 80, 81, 82, 83, 84, 85, 86, 87, 88, 89, 90, 91, 92, 93, 94, 95, 96, 97, 98, or 99).

In a variation of method 1000, there is a method that includes the additional action of receiving, electronically, second input indicative of the recipient's willingness to put forth effort to listen to the desired media content, wherein the action of providing the recipient with one or more selections is also based on the second input. In this regard, in an exemplary embodiment, the action of receiving the input indicative of the willingness to put forth effort to listen can correspond to the results of the recipient sliding the easy-difficult bar on the smart phone 510 and the resulting input being electronically transferred to a remote location where the actor executing method 1000 is located. Corollary to this is that in an exemplary embodiment, the action of receiving input indicative of the willingness to put forth effort to listen can correspond to the results of the recipient and putting data regarding any one or more of the variables detailed above (e.g., word rate, gender, accent, etc.). The idea here is that in some instances, the recipient may be willing to execute a more intense training regime, and thus will be willing to attempt to listen to audio content that is more mentally taxing or otherwise difficult for the recipient to comprehend in an effort to improve his or her ability to hear with the cochlear implant. In other instances, the recipient may be unwilling to execute an intense training regime, and, in other instances, may simply want to take it easy and listen to audio content for reasons unrelated to training. Such a feature can enable a simplified input by the recipient and can enable a relatively straightforward embodiment that is simple to use by the recipient.

Still further, some exemplary embodiments of the just mentioned variation on method 1000 can optionally include or supersede the feature regarding the willingness with a third input indicative of the recipient's ability to hear with the hearing prosthesis. Thus, in an exemplary embodiment, there is a variation of method 1000 that includes receiving, electronically, second input indicative of the recipient's willingness to put forth effort to listen to the desired media content and/or receiving, electronically, third input indicative of the recipient's ability to hear with the hearing prosthesis. With respect to the latter, this need not necessarily relate to the recipient's willingness to exert effort to listen, but instead can be a factor that is indicative of the recipient's current prowess with respect to hearing with a cochlear implant. This could be a factor indicative of a location on the recipient's hearing journey. This can be qualitative and/or quantitative and/or can be correlated to a statistical data set. In any event, in an exemplary embodiment of this method, the action of providing the recipient with one or more selections is also based on the second input and/or the third input, respectively, and the topic item selections are prestored in a database and catalogued with indicators relevant to the recipient's willingness to put forth effort to listen and/or relevant to the recipient's ability to hear with the hearing prosthesis, concomitant with the storage feature of element 440 of FIG. 4. In an exemplary embodiment, an automated system, such as a computer algorithm that compares proxies of input data to proxies of tag data associated with individual items in the database, or any other database that may be commercially available that can be utilized to implement or otherwise enable the teachings detailed herein, is utilized to compare the second input and/or the third input rather wise compare data based on the second input and/or the third input (as well as the first input in some embodiments) to tags in the database to identify the items which will ultimately be proffered to the recipient.

Consistent with the teachings detailed above, the training or the retraining of method 1000 or any of the methods detailed herein can comprise listening to the media content for the specific purposes of training, as opposed to listening to the media content for other purposes, such as, for example, enjoyment, education, pleasure etc. Indeed, embodiments herein are directed towards providing content for the sole purpose of training the recipient to hear better in the long term, where the teachings herein are utilized to identify content that will increase the training compliance relative to that which would otherwise be the case because, for example, the recipient is more interested in the content or the content is less insulting or otherwise irritating to the recipient. Indeed, with respect to the latter, in some exemplary embodiments, data can be collected regarding the substantive content and such can be used as an additional factor to vet the universe of media content. For example, comedies that viewers consider to have "gross" content could be identified as such and the recipient could provide data indicating that such comedy should be excluded. Factors such as violence, mature themes, stupid plots, etc., all can be compiled and such additional information can be used in the vetting process to exclude (or add) from the items that are provided to the recipient.

Figure 13:
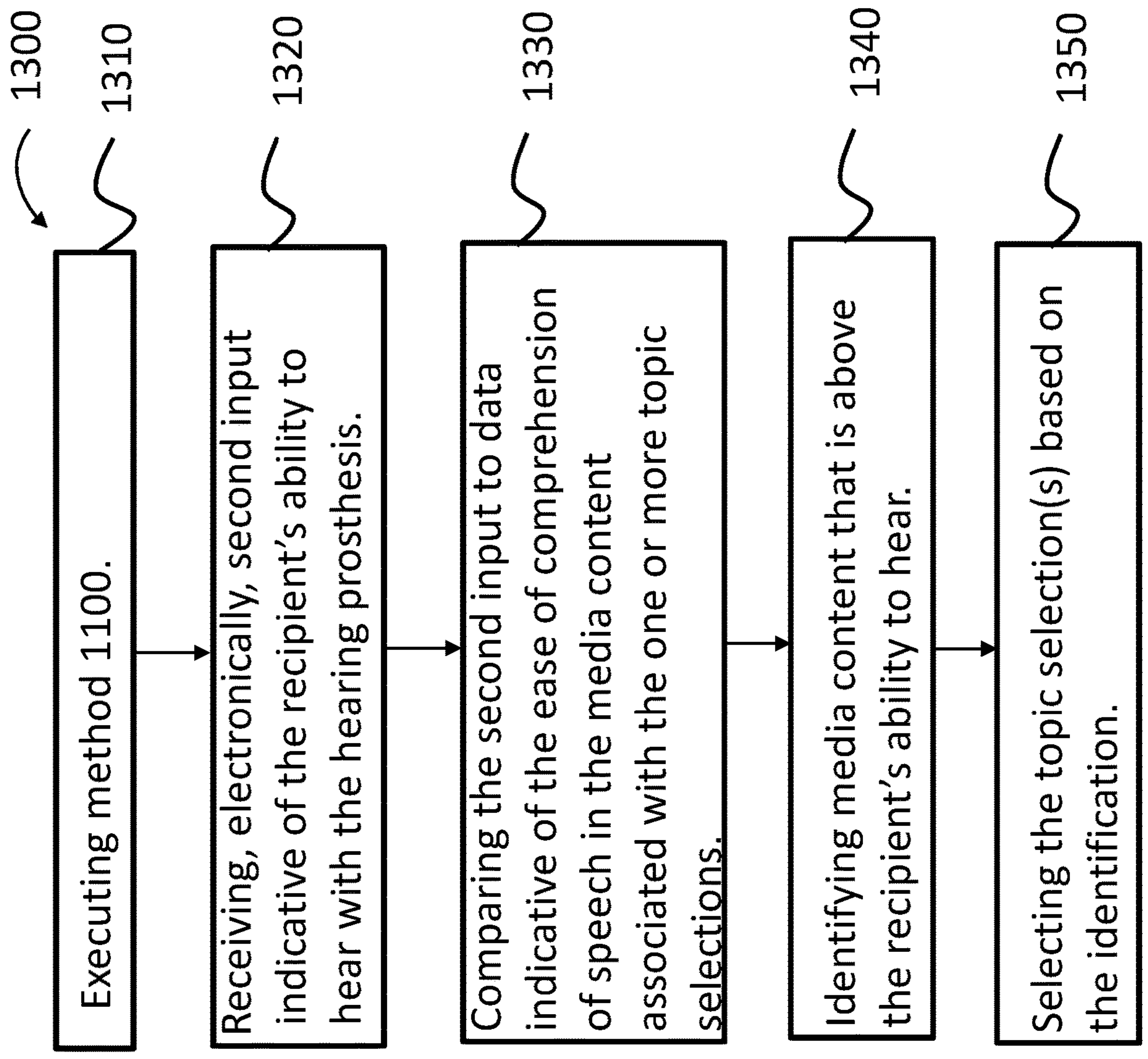

As noted above, in some exemplary embodiments, there is utilitarian value with respect to challenging the recipient during training. That is, there can be utilitarian value with providing the recipient with auditory media content that is more difficult to hear than other media content, for the purpose of enhancing or otherwise expanding the recipient's ability to hear. This can be analogous to training for a race or the like by running longer or by carrying extra weight, or by running up hill or increasing an incline on a treadmill, etc. In this regard, in an exemplary embodiment, there can be an exemplary method such as that represented by the algorithm of FIG. 13, which represents an algorithm for a method 1300, which includes method action 1310, which includes executing method 1000. Method 1300 also includes method action 1320 which includes the action of receiving, electronically, second input indicative of the recipient's ability to hear with the hearing prosthesis. Method 1300 also includes method action 1330, which includes comparing the second input to data indicative of the ease of comprehension of speech in the media content associated with the one or more topic selections. In this regard, again, any of the cataloging and/or database management techniques detailed herein or any other manner which will enable this method action can be utilized in at least some exemplary embodiments. FIG. 13 also presents method action 1340, which includes identifying media content that is above the recipient's ability to hear. In an exemplary embodiment, this basis is based on statistical data developed from a statistically significant population, and can include demographic detail that is particular to the recipient at issue. The idea here is that the actor is identifying content that will tax or otherwise stress the recipient beyond that which would be the case if content was provided that was within the recipient's comfort zone. That said, in at least some exemplary variations of this method, the level or the amount or other quantitative and/or qualitative factor that can be utilitarian above the recipient's current ability to hear is also identified, and limitations are placed on the available content so that content that is not too difficult will not be provided. In this regard, providing content that is too difficult may discourage the recipient from the training regimes, or otherwise tire the recipient too quickly such that the training will not be as utilitarian as otherwise might be.

Method 1300 also includes method action 1350, which includes selecting the topic selection(s) based on the identification. In the exemplary embodiments of method 1300, the provided one or more topic selections corresponds to the selected topic selection(s), and the training or retraining increases a training compliance relative to that which would be the case if only media content that is above the recipient's ability to hear was made available to the recipient without the identification. Again, in an exemplary embodiment, the compliance can be at least X % greater, on average (mean, median, and/or mode), relative to that which statistically would have been the case in the absence of the identification.

It is noted that at least some exemplary embodiments can focus on a specific feature of a hearing loss of a recipient. By way of example and not by way of limitation, a feature of some hearing loss can be frequency ranges and/or a length of time of hearing loss and/or whether or not the recipient ever had hearing, etc. In this regard, in an exemplary variation of method 1000, there is the additional action of receiving, electronically, second input indicative of a feature of the recipient's hearing loss, wherein the action of providing the recipient with one or more selections is also based on the second input and the topic item selections are prestored in a database and catalogued with indicators relevant to the feature of the recipient's hearing loss.

It is noted that any of the methods detailed herein can also be executed in conjunction with the following actions. In an exemplary embodiment, there is the action of automatically electronically conveying and/or displaying any one or more or all of the identified specific content/the content items identified as a result of the methods detailed herein upon the completion of the action of identifying. In this regard, any action of identifying disclosed herein corresponds to a disclosure, in at least some embodiments, of executing an algorithm that compares first sets of data to other sets of data (e.g., the former can be data based on the inputs and the latter can be data associated with the database), and upon a determination that the data matches or otherwise meets a predetermined requirement, the action of identifying is executed (whereas if the data does not match or otherwise meet a predetermined requirement, the action of identifying is not executed). In some embodiments again, upon the action of identifying, the devices and/or systems are configured to automatically display or transmit (electronically, for example), the identified content, such as transmitting the data to the user or to a recipient, etc. in some exemplary embodiments, the devices and/or systems detailed herein are configured to automatically play the content and/or provide the recipient with an indication that upon an action being taken, such as swiping a button or providing a command, etc., the content will be played or at least downloaded.

In this regard, with respect to the method actions detailed herein regarding receiving, electronically, first input indicative of a recipient of a hearing prosthesis' desired media content and providing the recipient with one or more topic item selections based on the first received input, and intermediate action can include the action of identifying just detailed, which can include execution of the comparison of the various data items, wherein the action of providing the recipient with the one or more topic item selections can be executed upon the data items correlating with each other and where the action of providing the recipient with one or more topic items is not executed if the data items do not correlate with each other.

Further, as will be noted herein, some embodiments include the action of searching for audio and/or audio-visional content and identifying such, and evaluating the identified content. In an exemplary embodiment, the action of evaluating can also be triggered based on a comparison of two data sets. In an exemplary embodiment, upon the identification of content, the system could be configured to automatically evaluate the content. In an exemplary embodiment, the algorithm that can control this could utilize a logic tree or the like where if the identified content meet certain criteria, the analysis is automatically executed, and if the identified criteria does not meet a criteria, the analysis is not automatically executed.

In this regard, it is noted that any method action herein related to a method action that can be executed on a device and/or a system can correspond to an automated method action that is executed by a computer or a machine that is configured to execute such. In an exemplary embodiment, these computers and/or machines include logic circuits that evaluate whether or not a certain predetermined factors are present, and if they are present, the method is executed automatically, and if they are not present the method is not executed. For example, the automatic conversion of audio data to the content to text can be executed upon a determination that the audio content is in a certain language, for example, and will not be executed if a determination is made that the audio content is in another language and/or is otherwise not one or more of certain predetermined languages.

Any of the indicators detailed herein that are provided can be provided automatically, again upon the use of an algorithm or the like that utilizes a logic tree where if data correlates to other data, the indicator is automatically provided, and if the data does not correlate to other data, the indicator is not automatically provided. Such is also the case with respect to any of the evaluation processes that are disclosed herein, which can be executed automatically in some embodiments, providing that a logic algorithm is executed and the logic algorithm indicates that the evaluation should automatically be executed.

Figure 14:
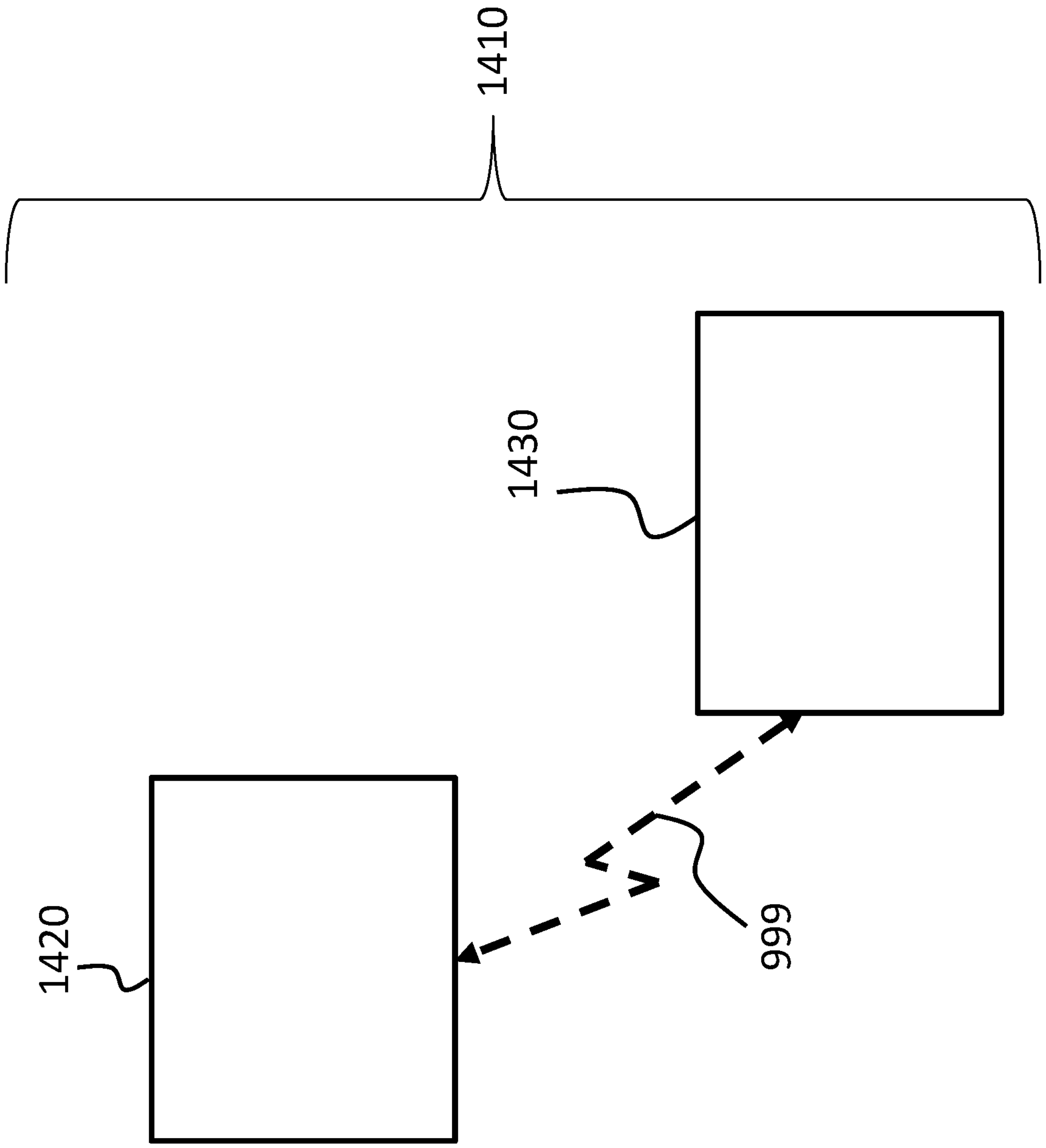
FIGS. 14 and 15 present some exemplary black box diagrams according to exemplary embodiments.

Consistent with the theme detailed above regarding training and/or retraining, in an exemplary embodiment, there is a training system (which includes a retraining system), such as is conceptually represented in black box format in FIG. 14 by system 1410, which in an embodiment can be a hearing prosthesis training system, that includes a first sub-system 1420 configured to receive first input indicative of a recipient of a hearing prosthesis' desired audio and/or audio-visual content and receive second input indicative of a feature of the recipient that is related to a sensory and/or a mental state of the recipient. With respect to the sensory state, this can correspond to a recipient having hearing deficiency. That said, in some embodiments where the training system is not limited to a hearing prosthesis, such as where the training system can be for a retinal implant or the like, the sensory state can be a vision deficiency. With respect to the mental state, this can be a fatigue state or the like or otherwise a state indicative of how willing the recipient is to engage in training or the like. In this regard, the content that is ultimately provided can be vetted so as to provide content that is streamlined to work with the recipient with respect to one or both of these states in a manner better than that which would be the case in the absence of such input.

In an exemplary embodiment, the first sub-system corresponds to the smart phone 510 detailed above. In an exemplary embodiment, the first subsystem can correspond to a personal computer etc. In an exemplary embodiment, the first subsystem can instead be a remote server or the like which receives the input via the Internet or via land lines or via a wireless system, etc. In this regard, the first subsystem is not explicitly limited to a device that is held or otherwise in direct possession of the recipient or someone associated with the recipient. Still, consistent with the embodiment where the first subsystem is a smart phone or a computer or the like, in an exemplary embodiment, the first sub-system is a portable electronics device having a GUI and the GUI includes at least one data entry spot for the first input and at least one data entry spot for the second input. This can correspond to or otherwise be analogous to any data entry spot on a smart phone or the like. Still further, in an exemplary embodiment, where the first sub-system is a portable electronics device having a GUI, and the GUI includes at least one data entry spot for the first input, the GUI can also have at least one data entry spot for the second input. Further, in at least some exemplary embodiments, the first sub-system is configured to provide output to the recipient indicative of the identified media content. For example, the GUI could display titles of movies or the like that are identified by executing the methods detailed herein for the inputted data.

Figure 15:
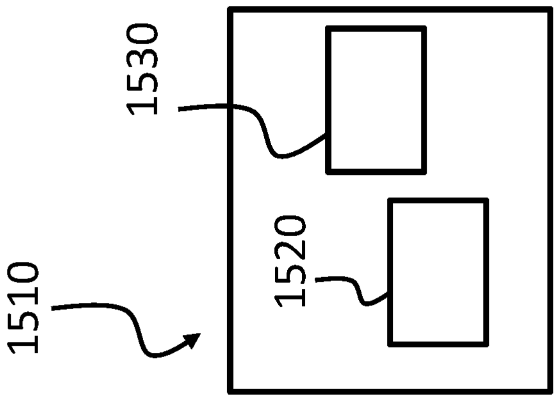

In an exemplary embodiment, the training system includes a second sub-system represented by black box 1430 configured to identify media content based on the first and second input. In an exemplary embodiment, the second subsystem can be a remote device from the first subsystem in communication with each other via a link 999 (internet, telephone, etc.), while in another exemplary embodiment, the first and second subsystem can be part of the same device, as is depicted by way of example in FIG. 15 (where reference 1510 indicates the system, reference 1520 indicates the first subsystem, and reference 1530 indicates the third subsystem). In an exemplary embodiment, the first and/or the second subsystem can be computer devices which include memory or otherwise are configured to access source data to enable the teachings detailed herein. The first and/or second systems can correspond to processors and/or microprocessors or any other electronically based automated device that can enable the teachings detailed herein. Still in some embodiments, the subsystems can be general-purpose computers and/or specific purpose computers programmed with hardware and/or firmware and/or software to enable the teachings detailed herein.

In an exemplary embodiment, the second subsystem is configured to access a database representative of media content items (such as, for example, the audio content index detailed above, or any other database that can have utilitarian value with respect to enabling the teachings detailed herein). Further, the second subsystem is configured to identify one or more media content items from within the database based on the first and second input, wherein the action of identifying corresponds to the action of identifying media content.

Some additional details of the system will now be described.

In an exemplary embodiment, the sensory state is a state of the recipient's ability to comprehend speech and/or to hear with the hearing prosthesis based on a hearing percept evoked by the hearing prosthesis (or, for example, a state of the recipient's ability to comprehend light and/or to see with the sight prosthesis based on a site percept evoked by the site prosthesis, where the first subsystem is configured to receive first input indicative of a recipient of a vision prostheses' desired visual content and to receive second input indicative of a feature of the recipient that is related to a sensory and/or a mental state of the recipient, and the second subsystem is configured as detailed above).

In an exemplary embodiment, the mental state is a state of the recipient's desire / willingness to work to hear and/or comprehend what is heard (or to work to see and/or to comprehend what is seen). Again, this is concomitant with one of the goals in at least some embodiments of the teachings detailed herein, which is to increase compliance with a training regime. In this regard, it can be utilitarian to attempt to adjust a difficulty of the training/adjust the stress placed on the recipient by the training to accommodate his or her willingness to engage in the training.

Figure 16:
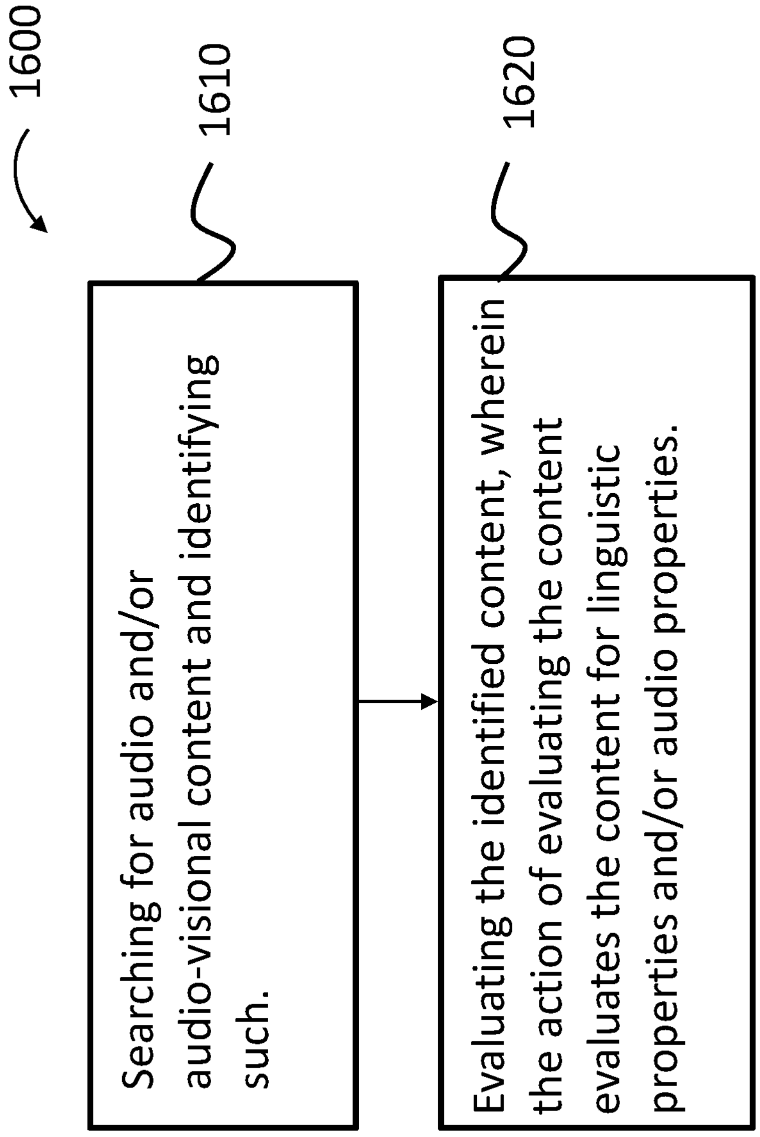
FIGS. 16-18 present exemplary flowcharts for exemplary algorithms according to exemplary embodiments.

With respect to FIGS. 6 and 7 above, it is again noted that some embodiments include methods and devices and algorithms for culling applicable content for hearing prosthesis training purposes or otherwise culling applicable content for ease of listening by recipients of hearing prostheses from a universe of content. In this regard, FIG. 16 presents an exemplary flowchart for an exemplary method, method 1600, which is a method of identifying hearing prosthesis recipient utilitarian audio content. The method comprises method action 1610, which includes searching for audio and/or audio-visional content and identifying such. This can be executed according to any of the search device's systems and/or methods detailed above or any others that can enable such. In an exemplary embodiment, the search can be based on a search of the World Wide Web and/or can be based on a search of databases of content providers and/or can be based on a search of programming offered by television networks or the like.

Method 1600 also includes method action 1620, which includes evaluating the identified content, wherein the action of evaluating the content evaluates the content for linguistic properties and/or audio properties. The evaluations can correspond to any of the evaluations detailed herein and/or variations thereof. Again, in an exemplary embodiment, the content can be evaluated for linguistic complexities. A language classification can be used to identify the type of language associated with the audio content. The content can be evaluated for word rate. The content can be evaluated for gender of the speaker and/or and accents of the speaker. Also, background sound can be evaluated. Based on one or more or all of these evaluations, a subset of the identified content can be provided to a recipient directly or indirectly in accordance with the teachings detailed herein.

In any event, in an exemplary embodiment, method action 1610 can include the action of executing a computer based search routine for content on the World Wide Web.

Figure 17:
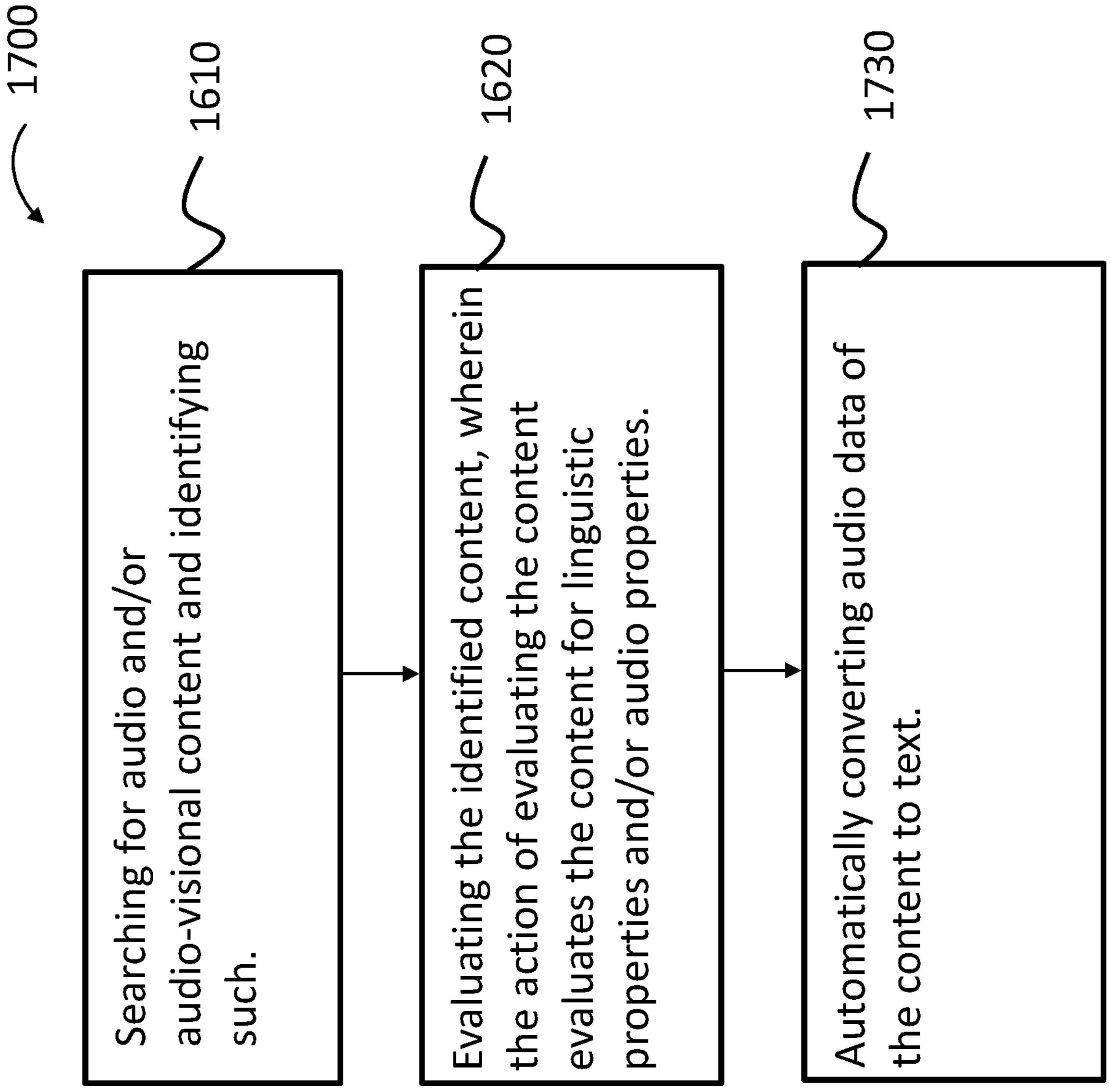

FIG. 17 presents another exemplary algorithm for an exemplary method, method 1700, which includes method actions 1610 and 1620 as detailed above, along with a method action 1730. Method action 1730 includes automatically converting audio data of the content to text. In an exemplary embodiment of this embodiment, the action of evaluating the identified content includes evaluating a linguistic complexity and/or a language type of the content, and in an exemplary embodiment, such evaluation is executed based on the text. Corollary to this is that in another exemplary embodiment associated with method 1700, the action of evaluating the identified content includes evaluating a word rate, a gender sound of speech within the audio data, an accent quality and/or a background sound level.

Consistent with the teachings detailed above with respect to the creation of an audio content index, in an exemplary embodiment, some of the aforementioned methods further include the action of storing results of the evaluation in a database catalogued based on the content for linguistic properties and/or audio properties. Still further, in an exemplary embodiment, the database is made accessible to an outside user, such as, for example, a user of the first subsystem detailed above with respect to system 1400. In an exemplary embodiment, the user can be a recipient of the hearing prosthesis, while in other exemplary embodiments, the user can be someone working with or otherwise providing care to the recipient of the hearing prosthesis.

In some exemplary methods, there is further the action of receiving first input from the user indicative of a recipient of a hearing prosthesis' desired content (drama, comedy, etc.), and receiving second input from the user indicative of a recipient of a hearing prosthesis' ability to comprehend speech and/or indicative of the recipient's ability to hear with the hearing prosthesis based on a hearing percept evoked by the hearing prosthesis. Such features are described above and will not be reiterated here. In some exemplary embodiments, the methods further include the actions of comparing the received first and second input to the catalogue of the database and providing indications of content publicly available based on the comparison. Thus, in an exemplary embodiment, there is a subscription service where the provider of the subscription service controls the database. It is noted that the database is not necessarily a database containing the content. The database can be a database containing the titles of the content and/or links to the content or otherwise links to where the content can be obtained. By way of example only and not by way of limitation, the database can indicate that a given title can be obtained on Hulu™ or Netflix™, or from Amazon™ or at the local library™. That said, in some embodiments, the database can also include the underlying content.

Embodiments of method 1600 also include variations that include executing the action of receiving first input from a user, the first input being indicative of a recipient of a hearing prosthesis' desired content. Again, this can correspond to the topic or the type, etc. This variation also includes the action of receiving second input from the user indicative of a recipient of a hearing prosthesis' ability to comprehend speech and/or indicative of the recipient's ability to hear with the hearing prosthesis based on a hearing percept evoked by the hearing prosthesis. The variation also includes the action of evaluating the identified content based on the first and second input, and the action of providing an indicator, to the user, of a subset of content publicly available based on the evaluation. It is noted that this method can be executed by a recipient's personal device (PC, smart phone, etc.), where the personal device actually is the search engine. Thus, in an exemplary embodiment, there is a personal computing device, such as a personal computer or a smart phone, etc., configured to execute one or more of the methods detailed herein, and certainly at least one or more of the method actions detailed herein. Still, in an exemplary embodiment, the aforementioned method can be executed by the system that is remote from the recipient/user.

Another variation of method 1600 utilizes feedback from the recipient or other user to enhance the method. The idea is that if the recipient decides that the content is bad or good, the system or controllers of the method, etc., modify the evaluation process to increase or decrease the likelihood of finding something similar, or modify the evaluation process such that the content is outright removed from the database even though the normal criteria would proffer it to a user in the future. In this regard, in an exemplary embodiment, there is a variation of method 1600 that includes the following additional actions:

A. receiving first input indicative of a recipient of a hearing prosthesis' desired content;

B. receiving second input indicative of a recipient of a hearing prosthesis' ability to comprehend speech and/or indicative of the recipient's ability to hear with the hearing prosthesis based on a hearing percept evoked by the hearing prosthesis;

C. executing an evaluation process that includes evaluating the identified content based on the first and second input;

D. providing an indicator, to a user, of a subset of content publicly available based on the evaluation.

Up until now, the above four method actions have been described above and will not be expanded upon. However, in an exemplary embodiment, the method further includes the following actions:

E. receiving feedback indicative of the recipient's satisfaction of the hearing experience with respect to at least one item of content of the subset of content;

F. modifying the evaluation process based on the received feedback;

G. receiving third input indicative of a recipient of a hearing prosthesis' desired content;

H. receiving fourth input indicative of a recipient of a hearing prosthesis' ability to comprehend speech and/or indicative of the recipient's ability to hear with the hearing prosthesis based on a hearing percept evoked by the hearing prosthesis;

I. executing the modified evaluation process including second evaluating the identified content based on the third and fourth input; and J. providing a second indicator, to a user, of a second subset of content publicly available based on the second evaluation.

With respect to action "E," this constitutes a feedback from the recipient or other user, where the feedback is indicative of the recipient satisfaction of the hearing experience with respect to at least one item of content of the subset of content. For example, if the recipient found the hearing experience difficult but the inputs from the recipient were indicative of a hearing experience that would be more easy, or vice versa, for example, the recipient could provide such indication.

Based on this feedback, with respect to action "F," evaluation process could be modified. It is noted that in some instances, more than one feedback is utilized with respect to executing method action "F." There could be a threshold level or criteria for determining how much feedback or the type of feedback (e.g., really bad would trigger a change with one feedback, but odd might require more than one occurrence) that results in the method being modified.

Method actions "G" and "H" are repeats of prior method actions with respect to the actions associated with carrying out those actions. G could be a new request, while H could be a reused request. That said, in an alternate embodiment, G and H could be executed in a new entirely. Method action "I," includes executing the modified evaluation process including second evaluating the identified content based on the third and fourth input, and method action "J," includes providing a second indicator, to a user, of a second subset of content publicly available based on the second evaluation. This user can be the same user or a different user as previously was the case. The point is that, statistically speaking, method actions I and J should provide better results than the prior method actions with the unmodified evaluation process.

Another variation of method 1600 renders a training regime dynamic, where the training becomes harder as the recipient becomes more comfortable with the hearing prostheses. In this regard, in an exemplary embodiment, there is a variation of method 1600 that includes the following additional actions:

A. receiving first input indicative of a recipient of a hearing prosthesis' desired content;

B. receiving second input indicative of a recipient of a hearing prosthesis' ability to comprehend speech and/or indicative of the recipient's ability to hear with the hearing prosthesis based on a hearing percept evoked by the hearing prosthesis;

C. receiving a third input indicative of a characteristic of training associated with the recipient;

D. evaluating the identified content based on the first and second and third input to identify a subset of content publicly available; and E. providing an indicator, to a user, of the identified subset of content publicly available based on the evaluation.

Actions A and B above have been previously discussed and will not be described further. Action C is a feature indicative of a characteristic of training associated with a recipient. Here, this can be the length of time that the recipient has been training, a desired training exercise (harder, easier, etc.), how strenuous the recipient is willing to exercise his or her hearing during the training, etc. Action D includes evaluating the content based on the three inputs to identify the subsets of the content that is publicly available, an action E entails providing the indicator to the user of the identified subset. The point is, with this exemplary method, the algorithm for identifying the contents can be adjusted or otherwise changed to account for peculiar aspects of training related to the individual recipient.

In an exemplary embodiment of the above noted method, the characteristic of training is a history of the recipient's prior experience with respect to at least some audio and/or audio-visional content previously used by the recipient to habilitate or rehabilitate the recipient's hearing. For example, whether the recipient has ever used the content before. Still further by example, how well the recipient performed with the content (same or similar or different) before. Further, the action of evaluating the identified content includes at least one of: (i) identifying the subset of content such that the subset includes content that would otherwise not be in the content but for the third input or (ii) identifying the subset of content such that the subset does not include content that would otherwise be in the content but for the third input. This latter identification process can include removing or adding content to the pool of content that will be provided or otherwise recommended to the user, respectively.

In an exemplary embodiment, the characteristic of training is a training severity characteristic (e.g., what is the desired goal for how hard the recipient will work and/or what is the desired stressors to be applied to the recipient, etc.). Further, again, the action of evaluating the identified content includes at least one of: (i) identifying the subset of content such that the subset includes content that would otherwise not be in the content but for the third input; or (ii) identifying the subset of content such that the subset does not include content that would otherwise be in the content but for the third input.

Figure 18:
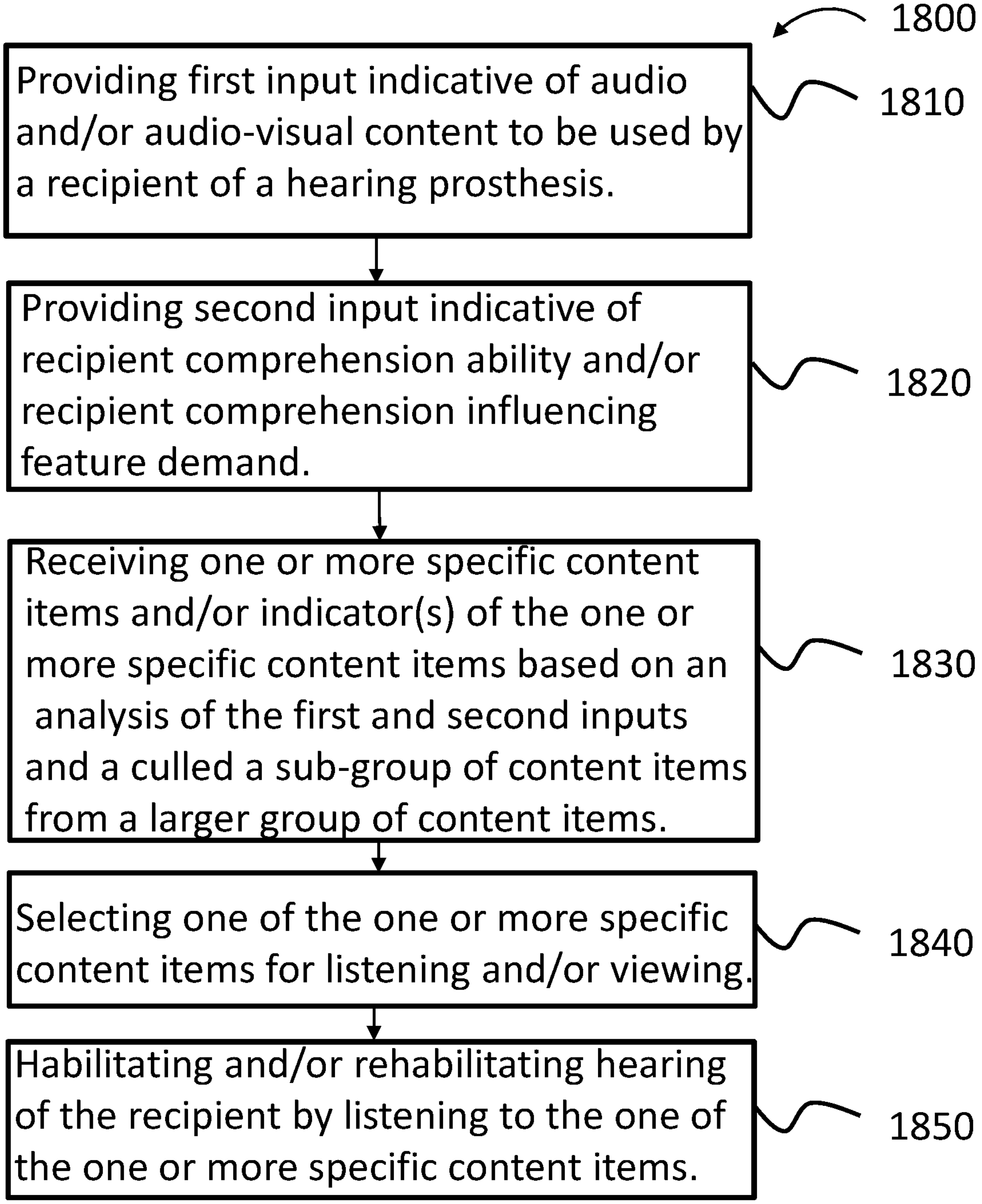

Embodiments are also directed towards methods that are executed solely by the recipient and/or a user who is caring for the recipient. While not explicitly limited to such, FIG. 18 provides a flowchart for an exemplary method, method 1800, which includes method action 1810, which includes providing first input indicative of audio and/or audio-visual content to be used by a recipient of a hearing prosthesis. Method 1800 also includes method action 1820, which includes providing second input indicative of recipient comprehension ability and/or recipient comprehension influencing feature demand. Both of these method actions can be executed utilizing a portable handheld consumer electronics device, such as a smart phone, and/or can be executed utilizing a personal computer, etc. Note further that in some exemplary embodiments, method actions 1810 and 1820 can be executed via a phone line or the like utilizing speech. In any event, with respect to the action of providing second input indicative of recipient comprehension ability, this can correspond to a statistically based quantifier and/or qualifier. Consistent with the teachings detailed above, this indicator can be utilized in the methods detailed above to aid in identifying content that is appropriate for the recipient or otherwise utilitarian for the recipient according to the teachings detailed herein. With respect to the recipient comprehension influencing feature demand, this can correspond to any of the inputs detailed herein regarding how easy or hard the recipient is willing to work to listen or otherwise comprehend the content, linguistic complexity, word rate measurement, the gender of the speaker, accents of the speaker and/or background noise levels. To be clear, method action 1820 can be executed utilizing any data that is indicative of the recipient's ability to comprehend speech or sound in general and/or any data that is indicative of a level of the recipient's willingness to work to comprehend the speech.

Method 1800 also includes method action 1830, which includes receiving one or more specific content items and/or indicator(s) of the one or more specific content items based on an analysis of the first and second inputs and a culled a sub-group of content items from a larger group of content items. With respect to the indicators of the one or more specific content items, these can be titles of the like or links to the underlying content, whereas with respect to the former, the specific content items, these can be the actual media items, which can be delivered via the Internet or via email, etc. Method 1800 also includes method action 1840, which includes selecting one of the one or more specific content items for listening and/or viewing, and method action 1850 which includes habilitating and/or rehabilitating hearing of the recipient by listening to the one of the one or more specific content items. With respect to this latter method action, this is distinguished from simply listening to content. Here, method action 1850 requires habilitation and/or rehabilitation as a result of listening to the specific content items, consistent with the goal of at least some embodiments herein to habilitate and/or rehabilitating hearing based on the implementations of the teachings detailed herein and/or variations thereof In an exemplary embodiment of method 1800, the action of providing the first input and the action of providing the second input is executed by the recipient and/or a person caring for the recipient utilizing a personal computing device, such as a smart phone or a PC.

Further, in an exemplary embodiment of the method of 1800, the actions of providing and receiving result in a topic associated with the content being more available to the recipient than that which would otherwise be the case in the absence of the action of providing the second input. In an exemplary embodiment of the method of 1800, the recipient comprehension influencing feature demand is at least one of word rate, accent of speaker(s), gender of speaker(s), linguistic complexity of speech or background sound of the audio data in the audio-visual content. In an exemplary embodiment, the recipient comprehension influencing feature demand is a feature indicative of what the recipient wants vis-à-vis the features that impact how hard it is to comprehend speech (hence the "demand" qualifier). Any feature that can be utilized that is indicative of a desire of the recipient with respect to how hard he or she is willing to work to listen can be utilized in at least some exemplary embodiments.

As noted above, in some exemplary embodiments of habilitation and/or rehabilitation, the total sound scene provided to the recipient while the recipient is listening to the audio data of the content to which he or she is listening is altered so as to adjust the ease of comprehension of the content. In this regard, in an exemplary embodiment of method 1800, there is the additional action of enabling the alteration of a feature of the selected one or more specific content to increase or decrease an ease of comprehension level of the content. By way of example only and not by way of limitation, the word rate can be increased or decreased by adjusting properties of the content. By way of example only and not by way of limitation, accents can be removed and replaced with different accents or no accents at all. Still further, a woman's voice can be replaced with a man's voice or vice versa.

Corollary to the above is that in an exemplary embodiment of the method 1800, there is further the action of enabling the application of one or more stressors when listening to the one of the one or more specific content items to increase a difficulty of comprehension of speech in the content. By way of example only, in an exemplary embodiment, noise is added to simulate background noise, thus making it harder to comprehend the speech and the audio content relative to that which would be the case in the absence of the stressor. Still further, by way of example only, an echo feature can be added. Sound of an additional speaker can be added which could speak over one of the people speaking. In some other exemplary embodiments, new accents can be provided, what would otherwise be the normal language and speech can be replaced with accented language. Again, background noise can be added to create a stressor or otherwise increase stressors.

In some exemplary embodiments, the total sound scene can be adjusted so that the speech of the content being listened to sounds like the speech is coming from a telephone, which is different than normal speech. The sound scene can be adjusted so that the speech sounds like it is coming from a tunnel or sound like it is in a cave, etc. The qualities of the sound can be adjusted to increase or decrease the comprehension level.

Note that while some of the above have been described in terms of creating stressors, in some embodiments, another way of looking at this is to instead provide training material for real-life situations (e.g., such as listening to someone speak on the phone). In this regard, such might not necessarily be considered a stressor as much as it is an environmental condition where there is utilitarian value with respect to practicing functioning therein.

Note also, while not necessarily a stressor per se, some other embodiments can include providing different qualities of content. For example, a podcast having a relatively poor quality than other podcasts might be utilized to increase the cognitive load on the recipient and otherwise make listening more difficult, but again not so difficult that the recipient will not want to conduct further training. Still further, quality can be adjusted on purpose so as to provide more stress on the recipient so as to exercise the recipient more strenuously.

Any device, system, and/or method of manipulating the total sound scene relative to that which would be otherwise the case in the absence of the manipulation to vary the overall difficulty of listening so as to enhance habilitation and/or rehabilitation relative to that which would otherwise be the case can be utilized in at least some exemplary embodiments.

To be clear, in an exemplary embodiment, the teachings detailed herein can be executed in whole or in part by a multiuse smart portable device and/or a personal computer and/or an interactive electronic device configured to execute the teachings detailed herein. In some exemplary embodiments, there is a multiuse smart portable device, such as those described above in FIGS. 2A, 2B, and FIG. 3 that includes an interactive display screen, which can be a touch screen as is commercially available on smart phones by Apple™ (e.g., iPhone 6™) or Samsung (e.g., Galaxy S7™) as of Jul. 4, 2017. In an exemplary embodiment, the multiuse smart portable device is a body worn device, such as by way of example only and not by way of limitation, with respect to the embodiment of FIG. 3, the smartwatch, which includes a chassis. This chassis, in some embodiments, can be a plastic and/or a metal chassis that supports such exemplary components as an LCD screen upon which images can be presented (e.g., text, pictures, graphics, etc.), where, in some embodiments, the LCD screen can be a touch screen one or more microphones (e.g., 1, 2, 3, 4, 5, 6, 7, 8, 9, 10, or more microphones), one or more speakers (e.g., 1, 2, 3, 4, 5 speakers), and/or one or more vibrators, including the actuator(s) and counterweight(s) (if utilized) thereof a central processing unit (CPU) which can be a computer chip or a computer processor, etc., one or more printed circuit boards, and lugs to which the watchband is attached, an RF transmitter, an RF receiver (e.g., a Wi-Fi and/or Bluetooth transmitter/receiver system), etc. It is noted that in at least some exemplary embodiments, the body worn device 241 corresponds to an Apple Watch™ Series 1 or Series 2, as is available in the United States of America for commercial purchase as of Jul. 4, 2017. In an exemplary embodiment, the body worn device 241 corresponds to a Samsung Galaxy Gear™ Gear 2, as is available in the United States of America for commercial purchase as of Jul. 4, 2017. In an exemplary embodiment, the aforementioned chassis carries one or more all of the components available in the just detailed Samsung and/or Apple devices. It is noted that in at least some exemplary embodiments, the chassis is a single monolithic component, while in other embodiments, the chassis is an assembly of components integrated with respect to one another. It is noted that the body worn device can include two or more chassis. It is noted that in the case of the multiuse smart portable device being a body worn device, the interactive display screen can correspond to the display screen of the aforementioned smartwatches.

In at least some exemplary embodiments of this embodiment, the multiuse smart portable device further comprises a wireless communication suite. In an exemplary embodiment, the wireless communication suite includes an FM/RF receiver and/or transmitter, or an IR receiver and/or transmitter, etc. In an exemplary embodiment, the wireless communication suite is based on Bluetooth technology, and includes a Bluetooth compatible device, such as a Bluetooth transceiver. Thus, in some exemplary embodiments, the multiuse smart portable device is configured to be in signal communication (RF communication, but also, in some other embodiments, IR and/or wired) with a hearing prosthesis and at least one of receive a signal therefrom or send a signal thereto.

In at least some exemplary embodiments, the multiuse smart portable device also includes an operating system (as which can be the case with respect to any of the computing devices/systems disclosed herein), which operating system can include a processor and a memory, along with software and/or firmware and/or hardware to execute one or more of the teachings detailed herein.

An exemplary system includes an exemplary device/devices that can enable the teachings detailed herein, which in at least some embodiments can utilize automation, as will now be described in the context of an automated and/or semiautomated system. That is, an exemplary embodiment includes executing one or more or all of the methods detailed herein and variations thereof, at least in part, in an automated or semiautomated manner using any of the following devices/systems as modified therefor, such as by programming/providing programming to execute the method(s).

Figure 19:
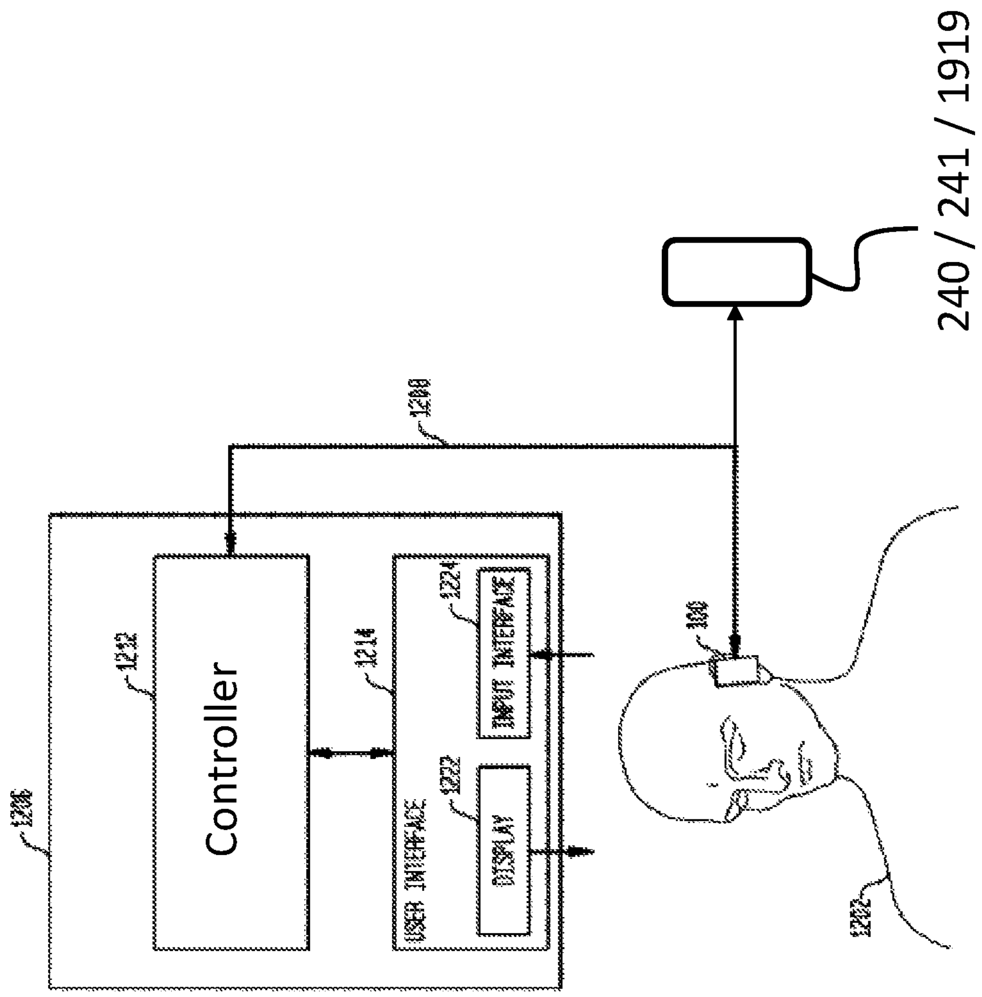
FIGS. 19 and 20 present exemplary functional diagrams of some systems according to exemplary embodiments.

FIG. 19 is a schematic diagram illustrating one exemplary arrangement in which a recipient 1202 and/or a caregiver and/or a user operated system 1206 can be used in conjunction with a medical device, such as cochlear implant system 100 and/or with a recipient controlled or recipient care giver controlled device, such as smart phone 240 or smart watch 241 or personal computer 1919. Hereinafter, device 100 will often be referred to as a hearing prosthesis/cochlear implant, but note that that can be a proxy for any of the devices that can be used to enable the pertinent teachings detailed herein.

System 1206 will be described, at least in part, in terms of interaction with a recipient and/or caregiver and, in some instances, with a user of the system separate from the recipient/caregiver. In an exemplary embodiment, system 1206 is a recipient/caregiver controlled system, and in some embodiments, it is a remote controlled system and/or controlled by a service provider.

In the embodiment illustrated in FIG. 19, the cochlear implant system and/or the computing device utilized to execute the method action at issue can be directly connected system 1206, which system can execute one or more of the method actions detailed herein (automatically in some embodiments, providing that the art enables such) and/or which system has one or more of the functionalities detailed herein) to establish a data communication link 1208 between the speech processor 116 or other processor of the cochlear implant system and/or of the computing device and system 1206. System 1206 can be bi-directionally coupled by a data communication link 1208 with any of the processor(s) of the devices of the recipient/caregiver. While the embodiment depicted in FIG. 19 depicts a system 1206 and a hearing prosthesis connected via a cable, any communications link that will enable the teachings detailed herein that will communicably couple the prosthesis and/or recipient/caregiver device with the system 1206 can be utilized in at least some embodiments.

System 1206 can comprise a system controller 1212 as well as a user interface 1214. Controller 1212 can be any type of device capable of executing instructions such as, for example, a general or special purpose computer, a handheld computer (e.g., personal digital assistant (PDA)), digital electronic circuitry, integrated circuitry, specially designed ASICs (application specific integrated circuits), firmware, software, and/or combinations thereof. As will be detailed below, in an exemplary embodiment, controller 1212 is a processor. Controller 1212 can further comprise an interface for establishing the data communications link 1208 with the device 100 (e.g., cochlear implant 100) and/or device 240, 241 and/or 1919. In embodiments in which controller 1212 comprises a computer, this interface may be for example, internal or external to the computer. For example, in an embodiment, controller 1206 and any of the recipient/caregiver devices can variously include a USB, Firewire, Bluetooth, WiFi, or other communications interface through which data communications link 1208 may be established. Controller 1212 can further comprise a storage for use in storing information. This storage can be for example, volatile or non-volatile storage, such as, for example, random access memory, solid state storage, magnetic storage, holographic storage, etc. Storage can be remote, and can be cloud based, etc.

User interface 1214 can comprise a display 1222 and an input interface 1224. Display 1222 can be, for example, any type of display device, such as, for example, those commonly used with computer systems. In an exemplary embodiment, element 1222 corresponds to a device configured to visually display a plurality of words to the recipient (which includes sentences), as detailed above.

Input interface 1224 can be any type of interface capable of receiving information from a patient, such as, for example, a computer keyboard, mouse, voice-responsive software, touch-screen (e.g., integrated with display 1222), microphone (e.g. optionally coupled with voice recognition software or the like) retinal control, joystick, and any other data entry or data presentation formats now or later developed. It is noted that in an exemplary embodiment, display 1222 and input interface 1224 can be the same component, e.g., in the case of a touch screen). It is noted that in at least some exemplary embodiments, the system 1206 is configured to execute one or more or all of the method actions detailed herein, where the various sub-components of the system 1206 are utilized in their traditional manner relative to the given method actions detailed herein.

In some exemplary embodiments, the system 1206 can be in part or in full a remote location (e.g., clinic), and in some embodiments, the system 1206 can be co-located with the recipient and/or caregiver.

In an exemplary embodiment, the system 1206 is configured to obtain data indicative of a first characteristic of content, wherein the content is an audio or an audio-visual content, obtaining data indicative of a second characteristic of the content and identify based on the first and second characteristics, specific content. In an exemplary embodiment, these actions can be executed via input from the device 240 etc., via link 1208, and/or via the user interface 1214, etc. In an exemplary embodiment, system 1206 can be configured to receive, electronically, first input indicative of a recipient of a hearing prosthesis' desired media content, to provide the recipient with one or more topic item selections based on the first received input. Again, the action of receiving the first input and/or providing the recipient with the one or more topic items can be executed via link 1208 and/or via user interface 1214.

In an exemplary embodiment, system 1206 can be configured to receive electronically, second input indicative of the recipient's ability to hear with the hearing prosthesis, compare the second input to data indicative of the ease of comprehension of speech in the media content associated with the one or more topic selections and identify media content that is above the recipient's ability to hear. Still further, in an exemplary embodiment, system 1206 can include/represent a first sub-system configured to receive first input indicative of a recipient of a hearing prosthesis' desired audio and/or audio-visual content and receive second input indicative of a feature of the recipient that is related to a sensory and/or a mental state of the recipient. System 1206 can further include or otherwise represent a second sub-system configured to identify media content based on the first and second input.

In an exemplary embodiment, system 1206 can be configured to search for audio and/or audio-visional content and identifying such and evaluate the identified content, wherein the evaluating the content evaluates content for linguistic properties and/or audio properties.

Also, in at least some exemplary embodiments, system 1206 can be utilized providing first input indicative of audio and/or audio-visual content to be used by a recipient of a hearing prosthesis and providing second input indicative of recipient comprehension ability and/or recipient comprehension influencing feature demand. In an exemplary embodiment, this can be executed via a device 240 via link 1208 and/or via the user interface 1214, etc. still further, in an exemplary embodiment, the actions of receiving one or more specific content items and/or indicator(s) of the one or more specific content items based on an analysis of the first and second inputs and a culled a sub-group of content items from a larger group of content items can be executed via output from system 1206.

In this vein, it is again noted that the schematic of FIG. 19 is functional. In some embodiments, a system 1206 is a self-contained device (e.g., a laptop computer, a smart phone, etc.) that is configured to execute one or more or all of the method actions detailed herein and/or variations thereof In an alternative embodiment, system 1206 is a system having components located at various geographical locations. By way of example only and not by way of limitation, user interface 1214 can be located at one location, and the system controller (e.g., processor) 1212 can be located at another remote location (geographical remote). By way of example only and not by way of limitation, the system controller 1212 can communicate with the user interface 1214, via the Internet and/or via cellular communication technology or the like, and this can also be the case with respect to link 1208, between system 1206 and the prosthesis 100 and/or smartphone 240, smartwatch 241 and/or computer 1919, etc. In at least some embodiments, the system controller 1212 can also communicate with the user interface 1214 via the Internet and/or via cellular communication or the like. Also, in an exemplary embodiment, the user interface 1214 can be a portable communications device, such as, by way of example only and not by way of limitation, a cell phone and/or a smart phone. Indeed, user interface 1214 can be utilized as part of a laptop computer or the like. Any arrangement that can enable system 1206 to be practiced and/or that can enable a system that can enable the teachings detailed herein and/or variations thereof to be practiced can be utilized in at least some embodiments.

Figure 20:
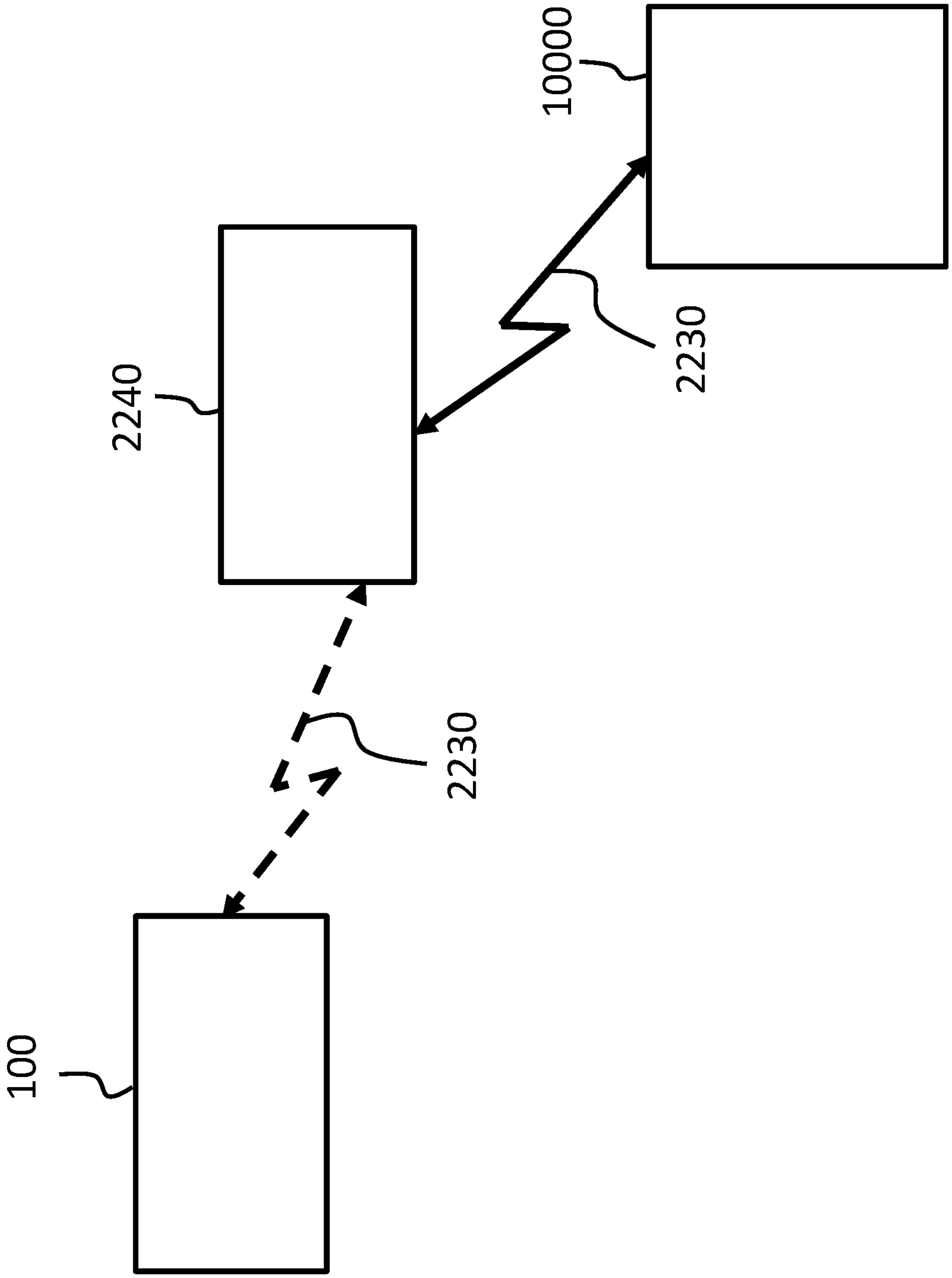

In view of the above, FIG. 20 depicts an exemplary functional schematic, where a device 2240, which will be detailed herein in this exemplary embodiment as a portable hand-held device 2240 or a computer controlled by the recipient/caregiver, but is to be understood as representative of any device that can enable the teachings detailed herein (e.g., remote dedicated hearing prosthesis control unit, personal computer, smartphone, landline phone, etc.), is in communication with a geographically remote device/facility 10000 via link 2230, which can be an internet link or cell phone link or any link that can have utilitarian value to enable the communication. The geographically remote device/facility 1000 can encompass controller 1212, and the remote device 240 can encompass the user interface 1214 (or the remote device can encompass the interface 1214). The geographic remote device/facility 10000 can be a clinic or a service provider. It is also noted that in the embodiment of FIG. 20, link 2230 can represent communication between device 2240 and the hearing prosthesis 100 and/or can represent communication between the portable handheld device 2240 and the recipient / caregiver (bypassing the hearing prosthesis). That is, in some embodiments, 2240 is the prosthesis, while in other embodiments, 2240 is an interface with the prosthesis.

An exemplary embodiment entails executing some or all of the method actions detailed herein where the recipient of the hearing prosthesis or caregiver thereof, the hearing prosthesis 100 and/or the portable handheld device 2240 is located remotely (e.g., geographically distant) from where at least some of the method actions detailed herein are executed.

In an exemplary embodiment where the device is configured to control a hearing prosthesis, in at least some exemplary embodiments, the device is configured to display control settings on the display screen to control the hearing prosthesis.

It is noted that any one or more of the method actions disclosed herein can be executed on any of the devices and/or systems disclosed herein, and that any disclosure of a method action corresponds to a device and/or system, such as those disclosed herein, that is programmed to execute and provided with structure to execute those method action(s). Also, any device and/or system disclosed herein with a functionality can correspond to the devices and/or systems disclosed herein with structure and/or programming to execute that functionality.

It is further noted that any disclosure of a device and/or system detailed herein also corresponds to a disclosure of otherwise providing that device and/or system.

Any disclosure herein of a method action also corresponds to a disclosure of an embodiment where a device and/or system is configured to execute that method action providing that the art enables such. Any disclosure herein of a device and/or system having functionality corresponds to a disclosure of an embodiment of the method of executing a method action corresponding to that functionality.

It is further noted that any element of any embodiment detailed herein can be combined with any other element of any embodiment detailed herein unless stated so providing that the art enables such. It is also noted that in at least some exemplary embodiments, any one or more of the elements of the embodiments detailed herein can be explicitly excluded in an exemplary embodiment. That is, in at least some exemplary embodiments, there are embodiments that explicitly do not have one or more of the elements detailed herein.

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. A training system, comprising:

a first sub-system configured to:

receive first input indicative of a person's desired audio and/or audio-visual content; and receive second input indicative of and/or related to an ability of the person to comprehend the desired audio and/or audio-visual content; and a second sub-system configured to:

identify media content based at least on the first and second input.

2. The system of claim 1, wherein:

the system is a sensory prosthesis training system.

3. The system of claim 1, wherein:

the person is a recipient of a sensory prosthesis.

4. The system of claim 1, wherein:

the system is a hearing training system.

5. The system of claim 4, wherein:

the person is a person with a hearing disorder.

6. The system of claim 1, wherein:

the system is a hearing prosthesis training system.

7. The system of claim 6, wherein:

the person is a recipient of a hearing prosthesis.

8. The system of claim 1, wherein:

the second input is indicative of a feature of the person that is related to a sensory and/or a mental state of the recipient.

9. The system of claim 8, wherein:

the sensory state is a state of the person's ability to comprehend speech and/or to hear with a hearing prosthesis based on a hearing percept evoked by the hearing prosthesis; and the mental state is a state of the person's desire to work to hear and/or comprehend what is heard.

10. The system of claim 8, wherein:

the first sub-system is a portable electronics device having a GUI; and the GUI includes at least one data entry spot for the first input and at least one data entry spot for the second input.

11. The system of claim 8, wherein:
the first sub-system and the second sub-system are part of the same device.
12. The system of claim 8, wherein:
the first sub-system is a portable electronics device having a GUI;
the GUI includes at least one data entry spot for the first input and at least one data entry spot for the second input; and
the first sub-system is configured to provide output to the recipient indicative of the identified media content.
13. The system of claim 8, wherein:
the first sub-system and the second sub-system are respectively parts of different devices in signal communication with one another.
14. The system of claim 8, wherein the second sub-system is configured to:
access a database representative of media content items; and
identify one or more media content items from within the database based on the first and second input, wherein the action of identifying corresponds to the action of identifying media content.
15. The system of claim 1, wherein:
the second input is indicative of and/or related to a desired listenability of the desired audio and/or or audio-visual content.
16. The system of claim 1, wherein:
the second input is a feature indicative of and/or related to an accessibility of the desired audio and/or audio-visual content.
17. The system of claim 1, wherein:
the media content that can be identified is children's stories or children's television.
18. The system of claim 1, wherein:
the second sub-system includes a search engine that is used to identify the media content.
19. The system of claim 1, wherein:
the second sub-system includes a means for identifying media content.
20. The system of claim 1, wherein:
the media content is music, singing, audio books and/or television/video.
21. The system of claim 1, wherein:
the second sub-system is configured to search the World Wide Web to identify the media content.
22. The system of claim 1, wherein:
the system identifies the media content based on a desired word rate of the media content, gender of speaker of the media content, accent of a speaker of the media content, linguistic complexity level of the media content and/or background sound features of the media content.
23. The system of claim 1, wherein:
the received first input is input indicative of the person's desired theme for audio and/or visual content.
24. The system of claim 1, wherein:
the system is configured to extract properties from speech audio and/or audio-video content that is related to speech listening difficulty; and
the second sub-system identifies the media content based at least on the extracted properties.
25. The system of claim 1, wherein:
the system is configured to identify media content with less sophisticated vocabulary for consumption by the person at a first temporal period and identify media content with more sophisticated vocabulary for use by the person after the first temporal period after the person's ability to comprehend speech improves.
26. The system of claim 1, wherein:
the system is configured to identify media content that is less taxing to the person for consumption during a first temporal period and identify media content that is more taxing to the person for consumption by the person after the first temporal period after the person's ability to comprehend speech improves.
27. The system of claim 1, wherein:
the system is configured to identify media content based at least in part on properties extractable from speech audio content related to speech listening difficulty.

* * * * *